(12) United States Patent
Manolakos et al.

(10) Patent No.: US 12,517,207 B2
(45) Date of Patent: Jan. 6, 2026

(54) TRANSMISSION OF DIFFERENTIAL BROADCAST POSITIONING SIBS FOR REDUCED POWER CONSUMPTION

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 544 days.

(21) Appl. No.: 17/999,381

(22) PCT Filed: Jun. 16, 2021

(86) PCT No.: PCT/US2021/037678
§ 371 (c)(1),
(2) Date: Nov. 18, 2022

(87) PCT Pub. No.: WO2022/010626
PCT Pub. Date: Jan. 13, 2022

(65) Prior Publication Data
US 2023/0144714 A1 May 11, 2023

(30) Foreign Application Priority Data
Jul. 8, 2020 (IN) .............................. 202041028976

(51) Int. Cl.
*G01S 5/02* (2010.01)
*H04L 5/00* (2006.01)
*H04W 72/12* (2023.01)

(52) U.S. Cl.
CPC .......... *G01S 5/0236* (2013.01); *H04L 5/0051* (2013.01); *H04W 72/12* (2013.01)

(58) Field of Classification Search
CPC .... G01S 5/0236; H04L 5/0051; H04W 72/12; H04W 4/50; H04W 4/029; Y02D 30/70
See application file for complete search history.

(56) References Cited

U.S. PATENT DOCUMENTS 10,383,081 B2   8/2019 Edge et al.
2007/0120737 A1*  5/2007 Moilanen ................ G01S 19/06
                                                    342/357.42

(Continued)

FOREIGN PATENT DOCUMENTS

CN     106211312 A    12/2016
CN     110907968 A     3/2020
WO     2018204554 A1  11/2018

OTHER PUBLICATIONS

3GPP TS 37.355: "3rd Generation Partnership Project, Technical Specification Group Radio Access Network, LTE Positioning Protocol (LPP) (Release 16)", 3GPP Standard, Technical Specification, 3GPP TS 37.355 V16.0.0 (Mar. 2020), 3rd Generation Partnership Project (3GPP), Mobile Competence Centre, 650, Route Des Lucioles, F-06921 Sophia-Antipolis Cedex, France, No. V16.0.0, Apr. 13, 2020 (Apr. 13, 2020), pp. 1-281, XP051893977.

(Continued)

*Primary Examiner* — Kabir A Timory
(74) *Attorney, Agent, or Firm* — Weaver Austin Villeneuve & Sampson LLP

(57) ABSTRACT

Positioning assistance data (PAD) is encoded in positioning System Information Blocks (posSIBs) and periodically broadcast by abase station in a differential manner A PAD element that is different relative to previously broadcast PAD is encoded in a block of posSIB separately from PAD that is unchanged. Another separate block of posSIB includes reference encoding identifying the changed PAD and provides scheduling information. A UE may decode the reference encoding and determine whether the UE has (Continued)

previously decoded the changed PAD. If the UE has previously received the PAD, but has not yet received the new or changed PAD, the UE may receive and decode the block of posSIB with only the changed PAD, thereby increasing efficiency.

48 Claims, 15 Drawing Sheets

(56) References Cited

U.S. PATENT DOCUMENTS

2018/0324740 A1\* 11/2018 Edge ................ H04W 64/00
2020/0053690 A1   2/2020 Fischer et al.

OTHER PUBLICATIONS

International Search Report and Written Opinion—PCT/US2021/037678—ISA/EPO—Sep. 30, 2021.

\* cited by examiner

TRANSMISSION OF DIFFERENTIAL BROADCAST POSITIONING SIBS FOR REDUCED POWER CONSUMPTION

CLAIM OF PRIORITY

This application claims priority to India Application No. 202041028976, filed Jul. 8, 2020, entitled "TRANSMISSION OF DIFFERENTIAL BROADCAST POSITIONING SIBS FOR REDUCED POWER CONSUMPTION," which is incorporated herein by reference in its entirety.

BACKGROUND

Field

Subject matter disclosed herein relates to estimation of a location of a mobile device and more particularly to informing a mobile device when broadcasted positioning assistance data has changed to help enable location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). A mobile device acquiring PRSs transmitted by different base stations may deliver signal-based measurements to a location server, which may be part of an Evolved Packet Core (EPC) or 5G Core Network (5GCN), for use in computing a location estimate of the mobile device. For example, a UE may generate positioning measurements from the downlink (DL) PRS such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT). Alternatively, a mobile device may compute an estimate of its own location using various positioning methods. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

Assistance data is sent to a mobile device to assist in acquiring and measuring signals and/or in computing a location estimate from the measurements, which may be useful for GNSS location and cellular based location determination. Sending assistance data individually to each mobile device, however, may result in significant delay and/or consume significant resources in a network and/or mobile device including battery use in a mobile device to interact with a network. Therefore, broadcast of assistance data to many or all mobile devices may be preferred in some implementations. In such implementations, a mobile device may benefit from knowing when assistance data being broadcast has changed in order to avoid repetitive reception and processing of assistance data that has not changed.

SUMMARY

Positioning assistance data (PAD) is encoded in positioning System Information Blocks (posSIBs) and periodically broadcast by a base station in a differential manner A PAD element that is different relative to previously broadcast PAD is encoded in a block of posSIB separately from PAD that is unchanged. Another separate block of posSIB includes reference encoding identifying the changed PAD and provides scheduling information. A UE may decode the reference encoding and determine whether the UE has previously decoded the changed PAD. If the UE has previously received the PAD, but has not yet received the new or changed PAD, the UE may receive and decode the block of posSIB with only the changed PAD, thereby increasing efficiency.

In one implementation, a method for supporting broadcast of positioning assistance data in a wireless network performed by a base station in a wireless network, includes broadcasting a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and broadcasting the second block of the posSIB that contains the positioning assistance data that has changed.

In one implementation, a base station configured to support broadcast of positioning assistance data in a wireless network, includes an external interface configured to wirelessly communicate with a UE in the wireless network; at least one memory; at least one processor coupled to the external interface and the at least one memory, wherein the at least one processor is configured to: broadcast a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and broadcast the second block of the posSIB that contains the positioning assistance data that has changed.

In one implementation, a base station configured to support broadcast of positioning assistance data in a wireless network, includes means for broadcasting a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and means for broadcasting the second block of the posSIB that contains the positioning assistance data that has changed.

In one implementation, a non-transitory computer readable storage medium including program code stored thereon, the program code is operable to configure at least one processor in a base station in a wireless network for supporting broadcast of positioning assistance data in a wireless network performed, the program code comprising instructions to: broadcast a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and broadcast the second block of the posSIB that contains the positioning assistance data that has changed.

In one implementation, a method for supporting broadcast of positioning assistance data in a wireless network performed by a location server in a wireless network, includes determining the positioning assistance data to be broadcast by a base station including the positioning assistance data that has changed and the positioning assistance data that has not changed; producing a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and sending the plurality of blocks the posSIBs to the base station.

In one implementation, a location server configured to support broadcast of positioning assistance data in a wireless network, includes an external interface configured to wirelessly communicate with a base station in the wireless network; at least one memory; at least one processor coupled to the external interface and the at least one memory, wherein the at least one processor is configured to: determine the positioning assistance data to be broadcast by a base station including the positioning assistance data that has changed and the positioning assistance data that has not changed; produce a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and send the plurality of blocks the posSIBs to the base station.

In one implementation, a location server configured to support broadcast of positioning assistance data in a wireless network, includes means for determining the positioning assistance data to be broadcast by a base station including the positioning assistance data that has changed and the positioning assistance data that has not changed; means for producing a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and means for sending the plurality of blocks the posSIBs to the base station.

In one implementation, a non-transitory computer readable storage medium including program code stored thereon, the program code is operable to configure at least one processor in a location server to support broadcast of positioning assistance data in a wireless network, the program code comprising instructions to: determine the positioning assistance data to be broadcast by the base station including the positioning assistance data that has changed and the positioning assistance data that has not changed; produce a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and send the plurality of blocks the posSIBs to the base station.

In one implementation, a method for supporting broadcast of positioning assistance data in a wireless network performed by a user equipment (UE) in a wireless network, includes receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and receiving and decoding the second block of the posSIB broadcast by the base station, the second block of the posSIB contains the positioning assistance data that has changed.

In one implementation, a user equipment (UE) configured to support broadcast of positioning assistance data in a wireless network, includes a wireless transceiver configured to wirelessly communicate with a base station in the wireless network; at least one memory; at least one processor coupled to the wireless transceiver and the at least one memory, wherein the at least one processor is configured to: receiving, via the wireless transceiver, and decoding a first block of a positioning System Information Block (posSIB) broadcast by the base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and receiving, via the wireless transceiver, and decoding the second block of the posSIB broadcast by the base station, the second block of the posSIB contains the positioning assistance data that has changed.

In one implementation, a user equipment (UE) configured to support broadcast of positioning assistance data in a wireless network, includes means for receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and means for receiving and decoding the second block of the posSIB broadcast by the base station, the second block of the posSIB contains the positioning assistance data that has changed.

In one implementation, a non-transitory computer readable storage medium including program code stored thereon, the program code is operable to configure at least one processor in a user equipment (UE) to support broadcast of positioning assistance data in a wireless network, the program code comprising instructions to: receiving and decoding a first block of a positioning System Information Block (posSIB) broadcast by the base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and receiving and decoding the second block of the posSIB broadcast by the base station, the second block of the posSIB contains the positioning assistance data that has changed.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
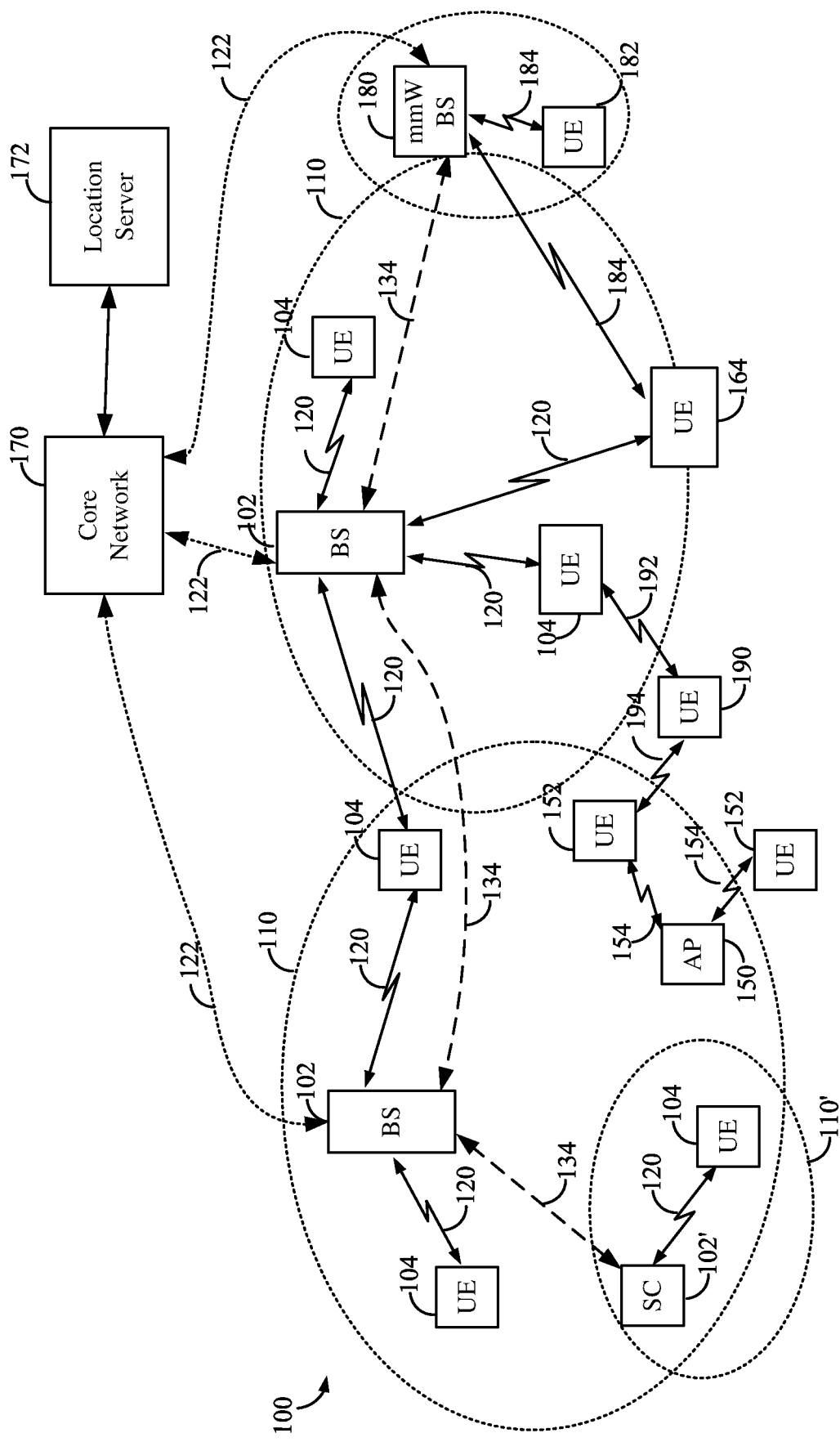
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the GNSS, TDOA, AoD, Multi-RTT, and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message An LS and a base station (e.g. an eNodeB for LTE access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and an LS that is an E-SMLC. In the case of NR access, the NRPPA protocol may be used to transfer such messages between a base station that is a gNodeB and an LS that is an LMF. It is noted that the terms "parameter" and "information element" (IE) are synonymous and are used interchangeably herein. It is also noted that the term "posSIB", as used herein, refers to a System Information Block (SIB) which includes assistance data (also referred to as "positioning assistance data") to support positioning of one or more UEs. However, in some instances, the term "SIB" is used herein to refer to a SIB containing assistance data to support positioning of one or more UEs. It is further noted that the terms "SI messages" and "positioning SI messages" are used interchangeably herein to refer to system information messages containing assistance data, e.g. assistance data in the form of one or more posSIBs.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
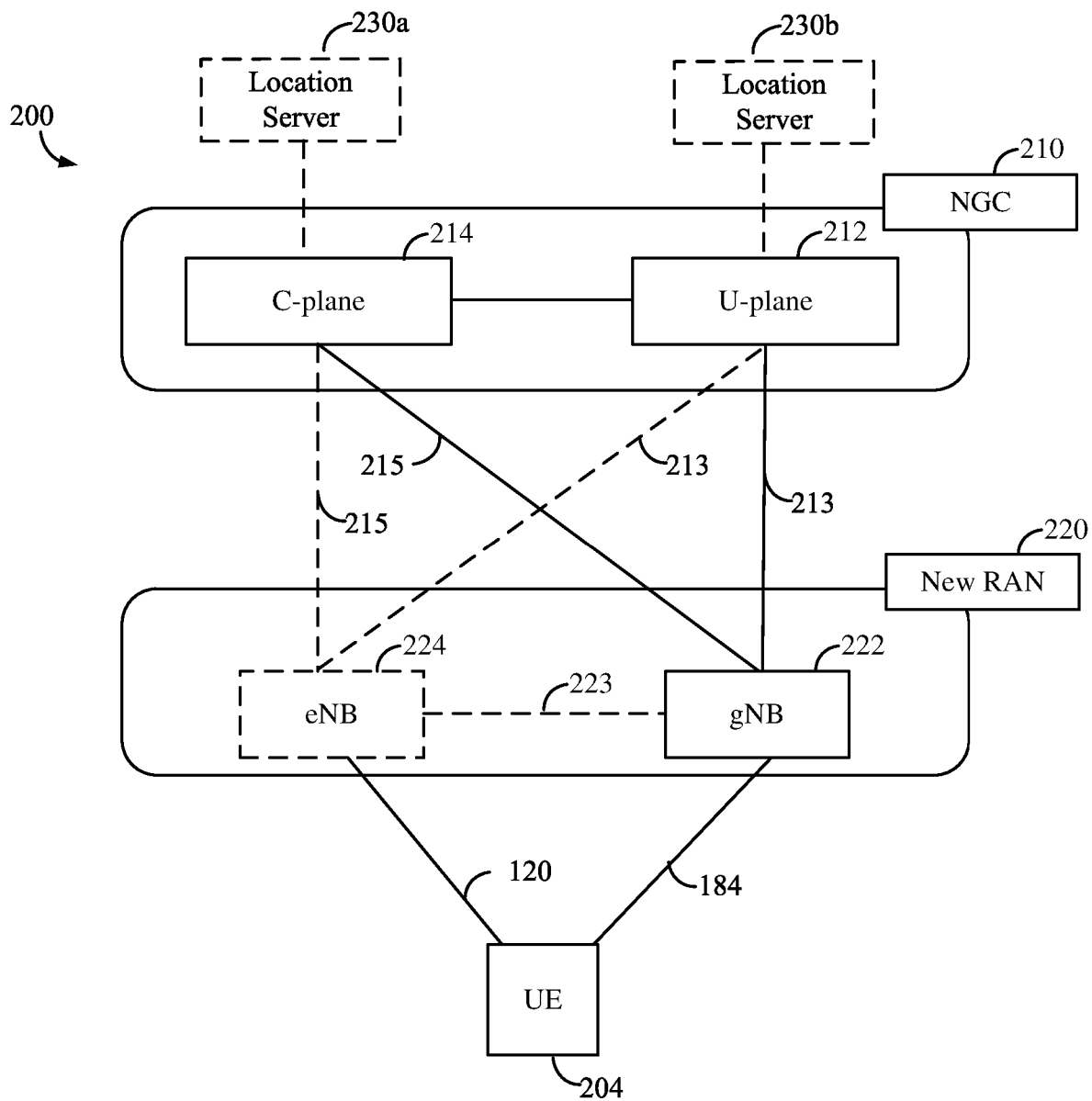
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
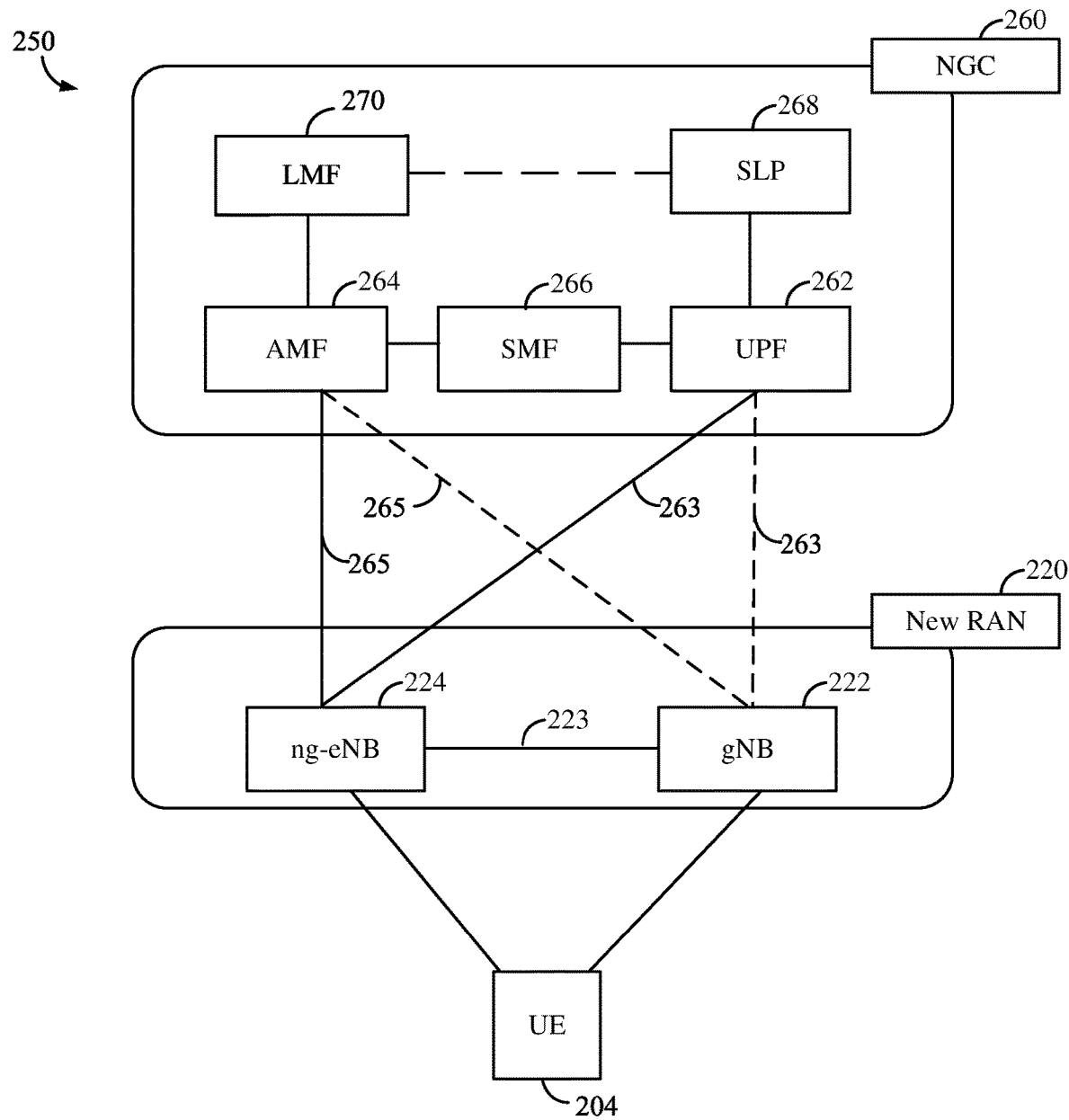

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either ng-gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
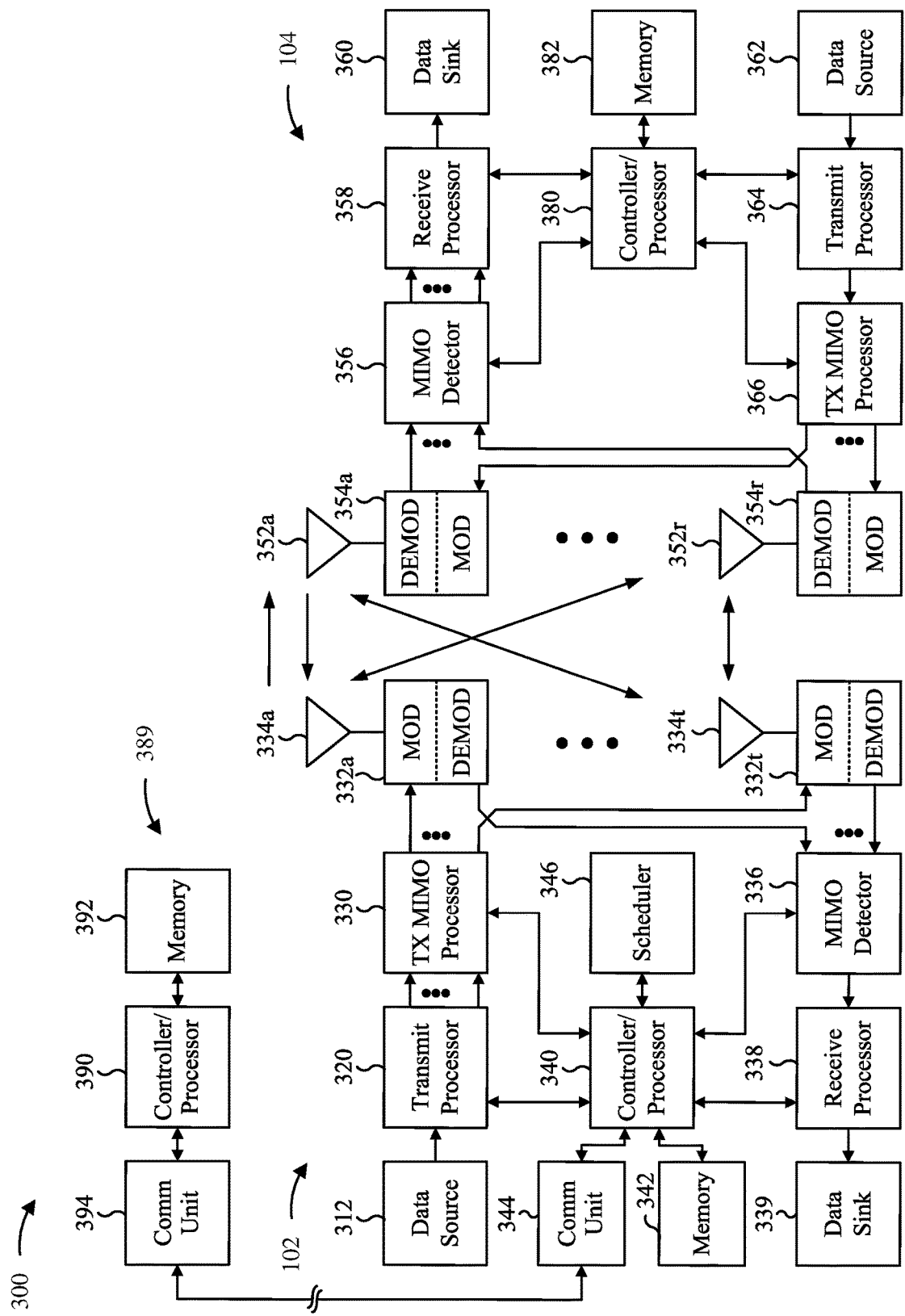
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, controller 390 of network controller 389, which may be location server 172, and/or any other component(s) of FIG. 3 may perform one or more techniques associated broadcasting positioning assistance data in a differential manner, as described in more detail elsewhere herein. For example, controller/processor 340 of base station 102, controller 390 of network controller 389, controller/processor 380 of UE 104, and/or any other component(s) of FIG. 3 may perform or direct operations of, for example, process 1300, 1400, and 1500 of FIGS. 13, 14, and 15, and/or other processes as described herein. Memories 342, 382, and 392 may store data and program codes for base station 102, UE 104, and network controller 389, respectively. In some aspects, memory 342 and/or memory 382 and/or memory 392 may comprise a non-transitory computer-readable medium storing one or more instructions for wireless communication. For example, the one or more instructions, when executed by one or more processors of the base station 102 network controller 389, and/or the UE 104, may perform or direct operations of, for example, process 1300, 1400, and 1500 of FIGS. 13, 14, and 15 and/or other processes as described herein. A scheduler 346 may schedule UEs for data transmission on the downlink and/or uplink.

As indicated above, FIG. 3 is provided as an example. Other examples may differ from what is described with regard to FIG. 3.

In particular implementations, the UE 104 may have circuitry and processing resources capable of obtaining location related measurements (also referred to as location measurements), such as measurements for signals received from GPS or other Satellite Positioning Systems (SPS's), measurements for cellular transceivers such as base stations 102, and/or measurements for local transceivers. UE 104 may further have circuitry and processing resources capable of computing a position fix or estimated location of UE 104 based on these location related measurements. In some implementations, location related measurements obtained by UE 104 may be transferred to a location server, such as the location server 172, location servers 230a, 230b, or LMF 270, after which the location server may estimate or determine a location for UE 104 based on the measurements.

Location related measurements obtained by UE 104 may include measurements of signals received from satellite vehicles (SVs) that are part of an SPS or Global Navigation Satellite System (GNSS) such as GPS, GLONASS, Galileo or Beidou and/or may include measurements of signals received from terrestrial transmitters fixed at known locations (e.g., such as base station 102 or other local transceivers). UE 104 or a separate location server (e.g. location server 172) may then obtain a location estimate for the UE 104 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), TDOA, AoA, multi-RTT, or combinations thereof. In some of these techniques (e.g. A-GNSS, AFLT and OTDOA), pseudoranges or timing differences may be measured by UE 104 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 104. Here, location servers, such as location server 172, location servers 230*a*, 230*b*, or LMF 270 may be capable of providing positioning assistance data to UE 104 including, for example, information regarding signals to be measured by UE 104 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA TDOA, AoA, multi-RTT, and ECID. The facilitation may include improving signal acquisition and measurement accuracy by UE 104 and/or, in some cases, enabling UE 104 to compute its estimated location based on the location measurements. For example, a location server may comprise an almanac (e.g., a Base Station Almanac (BSA)) which indicates the locations and identities of cellular transceivers and transmitters (e.g. base stations 102) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 104 may obtain measurements of signal strength (e.g. received signal strength indication (RSSI) or reference signal received power (RSRP)) for signals received from cellular transceivers (e.g., base stations 102) and/or local transceivers and/or may obtain a signal to noise ratio (S/N), a reference signal received quality (RSRQ), or a round trip signal propagation time (RTT) between UE 104 and a cellular transceiver (e.g., base stations 102) or a local transceiver. A UE 104 may transfer these measurements to a location server, to determine a location for UE 104, or in some implementations, UE 104 may use these measurements together with positioning assistance data (e.g. terrestrial almanac data or GNSS SV data such as GNSS Almanac and/or GNSS Ephemeris information) received from the location server to determine a location for UE 104.

In the case of TDOA, UE 104 may measure a Reference Signal Time Difference (RSTD) between signals, such as a Position Reference Signal (PRS) or Cell Specific Reference Signal (CRS), received from nearby transceivers or base stations (e.g. base station 102). An RSTD measurement may provide the time of arrival difference between signals (e.g. CRS or PRS) received at UE 104 from two different transceivers (e.g. an RSTD between signals received from two base stations 102). The UE 104 may return the measured RSTDs to a location server, which may compute an estimated location for UE 104 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 104 may be referred to as a location, location estimate, location fix, fix, position, position estimate or position fix, and may be geodetic, thereby providing location coordinates for the UE 104 (e.g., latitude and longitude) which may or may not include an altitude component (e.g., height above sea level, height above or depth below ground level, floor level or basement level). Alternatively, a location of the UE 104 may be expressed as a civic location (e.g., as a postal address or the designation of some point or small area in a building such as a particular room or floor). A location of a UE 104 may also include an uncertainty and may then be expressed as an area or volume (defined either geodetically or in civic form) within which the UE 104 is expected to be located with some given or default probability or confidence level (e.g., 67% or 95%). A location of a UE 104 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 104 or by another entity such as base station 102) that are used to determine (e.g. calculate) a location estimate for UE 104 may be referred to as measurements, location measurements, location related measurements, positioning measurements or position measurements and the act of determining a location for the UE 104 may be referred to as positioning of the UE 104 or locating the UE 104.

The communication system 100 may be configured to deliver positioning assistance data in downlink broadcast messages to UE devices such as UE 104.

Support for broadcasting location assistance data is supported by 3GPP for LTE access and may be similarly supported later by 3GPP for 5G NR access. Positioning assistance data may be included in positioning System Information Blocks (SIBs), sometimes referred to as posSIBs. The posSIBs may be carried in positioning System Information (SI) messages which are transmitted by a base station 102 using LTE wireless communication protocols or NR protocols. The mapping of posSIBs to SI messages may be flexibly configured according to a pos-schedulingInfoList parameter included in a SIB 1 message (also referred to as SIB1), which is also regularly broadcast from a base station 102 as defined for the Radio Resource Control (RRC) LTE protocol defined in 3GPP TS 36.331. For each assistance data element defined in LPP (TS 36.355), a separate posSIB-type may be defined. By way of example, posSIBs designated as pos-sib-type1-1 to pos-sib type1-7 may include common GNSS assistance data; pos-sib-type2-1 to pos-sib type2-19 may include GNSS specific assistance data, where the specific GNSS is indicated in the pos-schedulingInfoList in SIB1; and pos-sib-type3-1 may include OTDOA assistance data. Furthermore, each posSIB may be ciphered by a location server 172, e.g., using the 128-bit Advanced Encryption Standard (AES) algorithm (with counter mode), either with the same ciphering key or with a different ciphering key for each type of posSIB. An indication of whether a particular posSIB is or is not ciphered may be provided in the pos-schedulingInfoList parameter. The posSIBs may be formatted, encoded and grouped into SI messages at the location server 172, and provided transparently to base stations 102 in LPPa or NRPPa messages, for broadcasting by the base stations 102.

Information provided by the base stations 102 to the location server 172 using LPPa or NRPPa may include timing and configuration information for PRS transmission and location coordinates of the base stations 102. The location server 172 may then provide some or all of this information to the UE 104 as assistance data in an LPP and/or NPP message via the base stations 102.

An LPP and/or NPP message sent from the location server 172 to the UE 104 may instruct the UE 104 to do any of a variety of things, depending on desired functionality. For example, an LPP and/or NPP message could contain an instruction for the UE 104 to obtain measurements for GNSS (or A-GNSS), wireless LAN, and/or OTDOA (or some other position method). In the case of OTDOA, the LPP and/or NPP message may instruct the UE 104 to obtain one or more measurements (e.g. Reference Signal Time Difference (RSTD) measurements) of PRS signals transmitted within particular cells supported by particular base stations 102. The UE 104 may send the measurements back to the location server 172 in an LPP and/or NPP message (e.g. inside a 5G NAS message) via the serving base station 102.

The location server 172 may encode location assistance data and optionally cipher the encoded location assistance data and send the encoded and optionally ciphered location assistance data to a base station 102 for broadcast to UEs 104.

Positioning assistance data, which may be broadcast by base stations 102, are typically time varying and valid only for a certain time period. For example, GNSS ephemeris data is typically valid for about 2 hours. Other assistance data such as DGNSS corrections or RTK observations may change more frequently (on the order of a few seconds to tens of seconds).

For broadcast of assistance data using LTE or NR, assistance data may be included in a positioning System Information Block (posSIB). A posSIB may include assistance data of a specific type (e.g. assistance data for UE assisted OTDOA, UE based OTDOA, differential corrections for A-GNSS, acquisition assistance data for A-GNSS, RTK reference station information etc.) and may have an associated posSIB type (e.g. denoted by an integer or pair of integers). In a particular cell, a particular posSIB type may be periodically broadcast (e.g. at fixed intervals of 80 ms up to 5.12 seconds) and carrying the associated type of assistance data. The assistance data may remain the same for a certain period and may then be changed (e.g. to match a change in associated source information for the assistance data). The posSIB type may then continue to be periodically broadcast but now containing the changed assistance data. This process may continue with further changes to the assistance data.

To improve efficiency of broadcast, one or more posSIBs with the same common broadcast periodicity may be included in a positioning System Information (SI) message which is broadcast with the common broadcast periodicity. PosSIBs which contain more assistance data than can fit into one positioning SI message may be segmented into two or more posSIB segments and included in consecutive positioning SI messages (e.g. where each positioning SI message includes one posSIB segment for any posSIB that is segmented).

Scheduling information for positioning SI messages may be broadcast to a UE 104 using a System Information Block 1 (SIB1) which is broadcast by a base station 102 with a fixed periodicity and is periodically received and interpreted by a UE 104. The scheduling information may include an identification of each positioning SI message being periodically broadcast and may indicate the periodicity of each positioning SI message and an identify of each of the posSIBs which the positioning SI message includes. For posSIBs carrying assistance data for position methods related to A-GNSS or RTK, the scheduling information may further indicate a particular GNSS constellation (e.g. GPS, Glonass, Galileo or Beidou) to which the assistance data in the posSIB is applicable.

Using the scheduling information in the SIB1, a UE 104 can be aware of the positioning SI messages being broadcast in a particular cell, the types of posSIB included in each positioning SI message and the periodicity of each positioning SI message.

Currently, assistance data for measurement and reporting may be very large. For example, assistance data may include information for up to 256 TRPs that is broadcast. The UE 104, thus, needs to be intelligent to not read the same assistance data repeatedly. To support a more efficient means of enabling a UE 104 to determine when to receive and decode positioning assistance data, a systemInfoValueTag and/or an expiration timer may be used. An expirationTime field, for example, indicates how long the broadcast assistance data content is valid, and may be specified as UTC time and indicate when the broadcast assistance data content will expire. The expiration timer, for example, may include a start time indicating a time at which assistance data in the posSIB started to be valid and a duration indicating for how long after the start time the assistance data is expected to remain valid. The systemInfoValueTag may indicate to a UE 104 when a posSIB includes changed assistance data. For example, a value tag could be encoded as an integer whose value increases by one modulo some maximum value in the first or only segment of a posSIB that includes changed assistance data. A valueTag field may indicate to the UE 104 when there are any changes in the broadcast assistance data content. The valueTag is incremented by one, by the location server, every time a modified assistance data content is provided. This field is not included if the broadcast assistance data changes too frequently. If valueTag and expirationTime are absent, the UE 104 may assume that the broadcast assistance data content changes at every broadcast interval.

The use of existing systemInfoValueTag and expirationTime fields, however, is not power optimal for a UE 104. For example, for any TRP information change, e.g., addition or deletion, the systemInfoValueTag value will change, requiring the UE 104 to decode the full posSIB. Thus, even a small change will result in a systemInfoValueTag value will change and will require the UE 104 to receive and decode the full posSIB. In current framework, there is no mechanism for a base station 102 to inform a UE 104 about small or differential change with respect to an existing posSIB.

Figure 4:
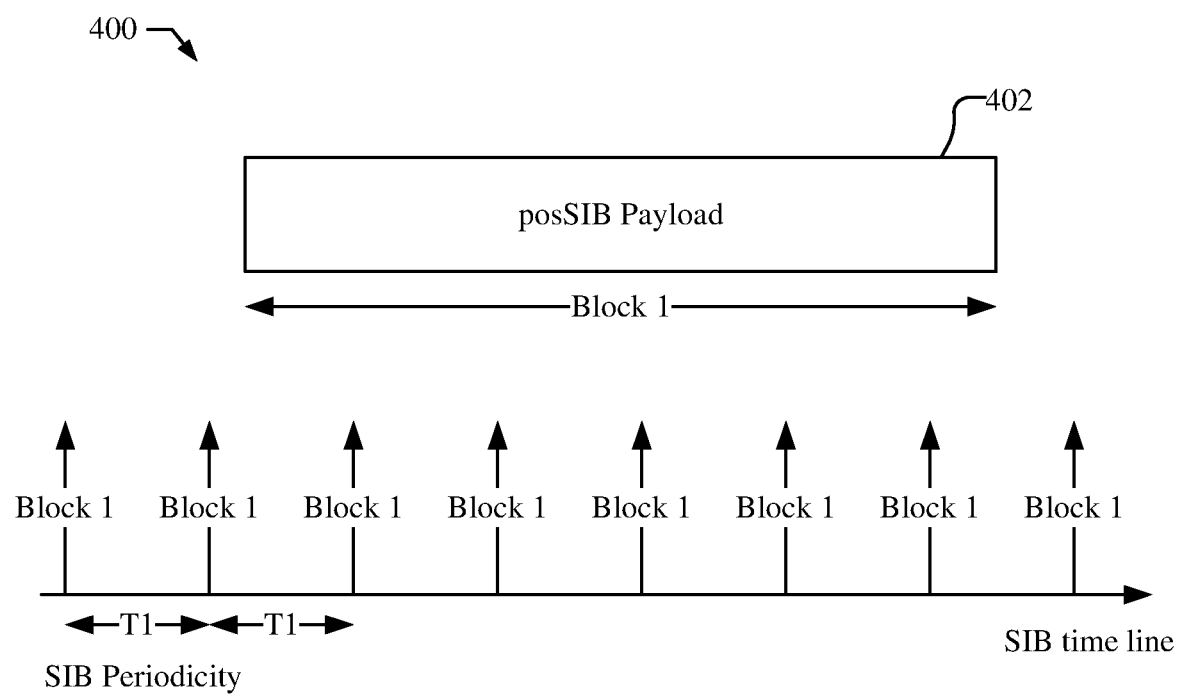
FIG. 4 illustrates positioning System Information Block (posSIB) scheduling using a block of posSIB that contains a full payload of posSIB.

FIG. 4, by way of example, illustrates SIB scheduling 400 as it currently exists. Block 1 402 includes the full posSIB payload. Block 1 with the posSIB payload is scheduled for periodic transmission, e.g., every T1 msec. For example, whenever the UE 104 powers up, the UE 104 needs to receive and decode Block 1 with the full posSIB payload. The information in the posSIB payload is associated with an expiration timer (expirationTime) and a value tag (systemInfoValueTag). The expirationTime field indicates how long the broadcast assistance data content is valid. It may be specified as UTC time and indicates when the broadcast assistance data content will expire. The valueTag field indicates to the target device any changes in the broadcast assistance data content. The valueTag may be incremented by one, by the location server, every time a modified assistance data content is provided. The valueTag may not be included if the broadcast assistance data changes too frequently. If valueTag and expirationTime are absent, the UE assumes that the broadcast assistance data content changes at every broadcast interval. If the UE 104 has already decoded the posSIB payload in Block 1, the UE 104 will check the expiration timer and the value tag associated with posSIB payload before reading and decoding the posSIB payload in Block 1 again. For example, before the expiration of the timer, the UE 104 may check the preamble of the next received Block 1 to determine if the value tag has changed. If the value tag has changed, the UE 104 may then decode the full posSIB payload.

By way of example, the expirationTime and valueTag may be included in an information element (IE) AssistanceDataSIBelement used in the IE SystemInformationBlockPos, as specified in 3GPP TS 36.331, shown in Table 1 below. The definition in Table 1 is based on a fragment of Abstract Syntax Notation One (ASN.1). The subscripts "-r15" may not be considered part of a parameter name and may be included only to indicate a 3GPP release in which a parameter was first defined (e.g. Release 15).

TABLE 1

```
-- ASN1START
AssistanceDataSIBelement-r15 ::= SEQUENCE {
    valueTag-r15                INTEGER (0..63)
                                OPTIONAL,
    expirationTime-r15          UTCTime
                                OPTIONAL,
    cipheringKeyData-r15        CipheringKeyData-r15
                                OPTIONAL,
    segmentationInfo-r15        SegmentationInfo-r15
                                OPTIONAL,
    assistanceDataElement-r15   OCTET STRING,
    ...
}
```

If only a small portion of the posSIB payload in Block 1 changes, the value tag will indicate that the posSIB payload includes a change and the UE 104 will need to decode the full posSIB payload, including the information that has not changed, which is inefficient for both the network and the UE 104.

There are currently three types of assistance data that may be broadcast for positioning. One type of assistance data, which is broadcast in posSibType6-1 is DL PRS assistance data. Another type of assistance data is broadcast in posSibType6-2 is TRP location data. The third type of assistance data is broadcast in possibType6-3 and is related to TRP Real Time Difference (RTD) information.

Table 2, below, is an IE in RRC that shows that the posSIBs are mapped into the System Information Blocks (Sibs) in Rel-16 (v16).

TABLE 2

```
SIB1-v16xy ::=                  SEQUENCE {
    posSI-SchedulingInfoList-r16    PosSI-SchedulingInfoList-r16
                                    OPTIONAL, -- Need R
    nonCriticalExtension            SEQUENCE{ }
                                    OPTIONAL
}
```

The broadcast assistance data may be broadcast at a fixed interval with scheduled periodicity (posSI-Periodicity) of, e.g., 80 ms, 160 ms, 320 ms, 640 ms, 1280 ms, 2560 ms, and 5120 ms. An offset (offsetToSI-Used) may be used to indicate that the SI messages in PosSI-SchedulingInfoList are scheduled with an offset of 8 radio frames compared to SI messages in SchedulingInfoList, where a radio frame is 10 ms. The offset (offsetToSI-Used) may be present only if the shortest configured SI message periodicity for SI messages in SchedulingInfoList is 80 ms.

A possible Pos-SchedulingInfoList is shown in Table 4 below. The definition in Table 1 is based on a fragment of Abstract Syntax Notation One (ASN.1). The subscripts "-r16" may not be considered part of a parameter name and may be included only to indicate a 3GPP release in which a parameter was first defined (e.g. Release 16). Table 4 shows a list of positioning SI messages (Pos-SchedulingInfoList), where each element (Pos-SchedulingInfo) provides the information of its content: Broadcast periodicity (in units of 10 ms (radio frames)) (posSI-Periodicity), offset (offsetToSI-Used) and the list of posSIBs (i.e., assistance data) included (Pos-SIB-MappingInfo). The list of Pos-SIB-Type's include information comprising (a) whether the assistance data is ciphered or not (encrypted), (b) information for an applicable GNSS (gnss-id, sbas-id), and (c) an indication of a specific posSIB type (pos-sib-type). The pos-sib-type maps one to one to a specific assistance data element, which is defined in LPP (TS 36.355). For example, posSibType1-1 includes GNSS Reference Time assistance, posSibType1-2 includes GNSS Reference Location, etc. The supported posSibType's mapped to assistance data elements are specified in Table 3, below. The NR related SIBs are sibs 6-1, 6-2, and 6-3.

TABLE 3

|  | posSibType [12] | assistanceDataElement |
|---|---|---|
| GNSS Common Assistance Data (clause 6.5.2.2) | posSibType1-1 | GNSS-ReferenceTime |
|  | posSibType1-2 | GNSS-ReferenceLocation |
|  | posSibType1-3 | GNSS-IonosphericModel |
|  | posSibType1-4 | GNSS-EarthOrientationParameters |
|  | posSibType1-5 | GNSS-RTK-ReferenceStationInfo |
|  | posSibType1-6 | GNSS-RTK-CommonObservationInfo |
|  | posSibType1-7 | GNSS-RTK-AuxiliaryStationData |
|  | posSibType1-8 | GNSS-SSR-CorrectionPoints |
| GNSS Generic Assistance Data (clause 6.5.2.2) | posSibType2-1 | GNSS-TimeModelList |
|  | posSibType2-2 | GNSS-DifferentialCorrections |
|  | posSibType2-3 | GNSS-NavigationModel |
|  | posSibType2-4 | GNSS-RealTimeIntegrity |
|  | posSibType2-5 | GNSS-DataBitAssistance |
|  | posSibType2-6 | GNSS-AcquisitionAssistance |
|  | posSibType2-7 | GNSS-Almanac |

TABLE 3-continued

| | posSibType [12] | assistanceDataElement |
|---|---|---|
| | posSibType2-8 | GNSS-UTC-Model |
| | posSibType2-9 | GNSS-AuxiliaryInformation |
| | posSibType2-10 | BDS-DifferentialCorrections |
| | posSibType2-11 | BDS-GridModelParameter |
| | posSibType2-12 | GNSS-RTK-Observations |
| | posSibType2-13 | GLO-RTK-BiasInformation |
| | posSibType2-14 | GNSS-RTK-MAC-CorrectionDifferences |
| | posSibType2-15 | GNSS-RTK-Residuals |
| | posSibType2-16 | GNSS-RTK-FKP-Gradients |
| | posSibType2-17 | GNSS-SSR-OrbitCorrections |
| | posSibType2-18 | GNSS-SSR-ClockCorrections |
| | posSibType2-19 | GNSS-SSR-CodeBias |
| | posSibType2-20 | GNSS-SSR-URA |
| | posSibType2-21 | GNSS-SSR-PhaseBias |
| | posSibType2-22 | GNSS-SSR-STEC- Correction |
| | posSibType2-23 | GNSS-SSR-GriddedCorrection |
| | posSibType2-24 | NavIC-DifferentialCorrections |
| | posSibType2-25 | NavIC-GridModelParameter |
| OTDOA Assistance Data (clause 7.4.2) | posSibType3-1 | OTDOA-UE-Assisted |
| Barometric Assistance Data (clause 6.5.5.8) | posSibType4-1 | Sensor-AssistanceDataList |
| TBS Assistance Data (clause 6.5.4.8) | posSibType5-1 | TBS-AssistanceDataList |
| NR DL-TDOA/DL-AoD Assistance Data (clause 6.4.3, 7.4.2) | posSibType6-1 posSibType6-2 posSibType6-3 | NR-DL-PRS-AssistanceData NR-UEB-TRP-LocationData NR-UEB-TRP-RTD-Info |

TABLE 4

```
-- ASN1START
-- TAG-POSSI-SCHEDULINGINFOLIST-START
PosSI-SchedulingInfoList-r16 ::= SEQUENCE (SIZE
(1..maxSI-Message)) OF
PosSI-SchedulingInfo-r16
PosSI-SchedulingInfo-r16 ::=SEQUENCE {
    offsetToSI-Used-r16             ENUMERATED {true}
        OPTIONAL,                   -- Need R
    posSI-Periodicity-r16 ,         ENUMERATED {rf8, rf16,
        rf32, rf64, rf128 rf256, rf512},
    posSIB-MappingInfo-r16          PosSIB-MappingInfo-r16,
    ...
}
PosSIB-MappingInfo-r16 ::= SEQUENCE (SIZE (1..maxSIB)) OF
PosSIB-Type-r16
PosSIB-Type-r16 ::= SEQUENCE {
    encrypted-r16                   ENUMERATED { true }
        OPTIONAL,                   -- Need R
    gnss-id-r16                     GNSS-ID-r16
        OPTIONAL,                   -- Need R
    sbas-id-r16                     SBAS-ID-r16
        OPTIONAL,                   -- Need R
    posSibType-r16                  ENUMERATED { posSibType1-1,
        posSibType1-2, posSibType1-3, posSibType1-4,
        posSibType1-5, posSibType1-6, posSibType1-7,
        posSibType1-8, posSibType2-1, posSibType2-2,
        posSibType2-3, posSibType2-4, posSibType2-5,
        posSibType2-6, posSibType2-7, posSibType2-8,
        posSibType2-9, posSibType2-10, posSibType2-11,
        posSibType2-12, posSibType2-13, posSibType2-14,
        posSibType2-15, posSibType2-16, posSibType2-17,
        posSibType2-18, posSibType2-19, posSibType2-20,
        posSibType2-21, posSibType2-22, posSibType2-23,
        posSibType3-1, posSibType6-1, posSibType6-2,
        posSibType6-3,... },
    areaScope-r16                   ENUMERATED {true}
        OPTIONAL -- Need S
}
GNSS-ID-r16 ::= SEQUENCE {
    gnss-id-r16                     ENUMERATED{gps, sbas,
        qzss, galileo, glonass, bds, ...},
    ...
}
SBAS-ID-r16 ::= SEQUENCE {
    sbas-id-r16                     ENUMERATED { waas,
```

TABLE 4-continued

```
        egnos, msas, gagan, ...},
    ...
}
-- TAG-POSSI-SCHEDULINGINFOLIST-STOP
-- ASN1STOP
```

As discussed above, in the current framework, when there is small change in the assistance data, a value tag will indicate that there is a change and the UE 104 is required to decode the entire posSIB payload. There is no mechanism for a base station 102 to inform a UE 104 about small or differential change with respect to an existing posSIB.

Accordingly, differential encoding of the posSIB is disclosed herein, which may be particularly useful for posSIB because of the heavy payload.

In an implementation, the positioning assistance data that has changed is included in blocks of posSIB in a differential manner and is broadcast separately from blocks of posSIB that includes positioning assistance data that has not changed. For example, positioning assistance data that has changed with respect to a reference posSIB, e.g., the previously broadcast positioning assistance data, may be encoded in a block of posSIB that is separate from the block of posSIB that includes the positioning assistance data that has not changed with respect to the reference posSIB. A separate block of posSIB, which is separately broadcast, includes reference encoding to identify the positioning assistance data that has changed. For example, a version number or value tag may be associated with each posSIB. The reference encoding may indicate the current version number of the posSIB that has changed with respect to the reference posSIB so that the UE 104 can determine the UE 104 has previously received and decoded the posSIB with positioning assistance data that has changed. Assuming that the UE 104 has not previously received the changed positioning assistance data, the UE 104 need only receive and decode the block of posSIB that includes positioning assistance data that has changed.

Figure 5:
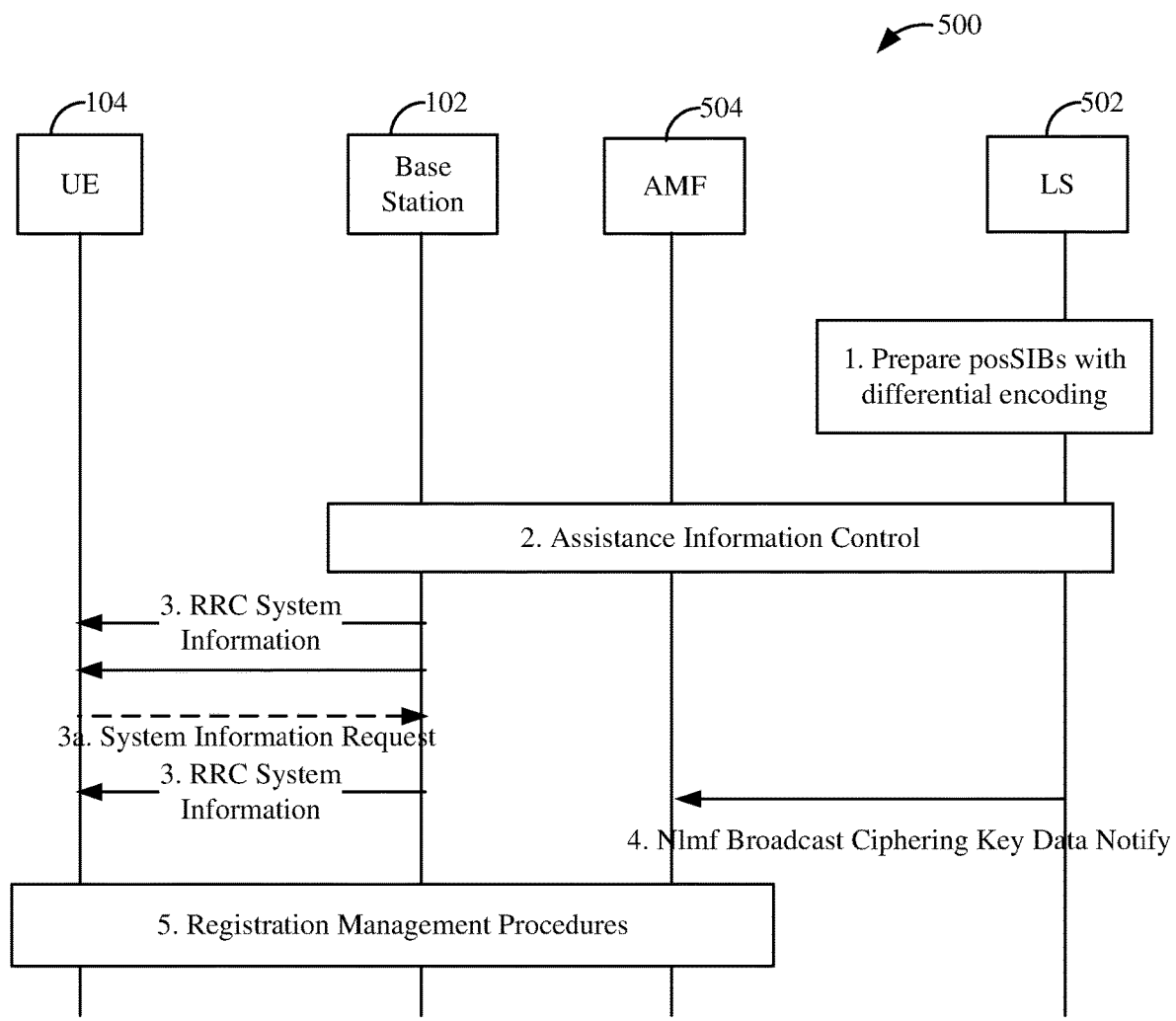
FIG. 5 shows an example of signaling flow for broadcasting positioning assistance data in a differential manner.

FIG. 5, by way of example, shows an example of signaling flow 500 for broadcasting positioning assistance data in a differential manner in communication system, such as communication system 100.

At stage 1, various assistance data elements for each supported positioning method are collected, processed and formatted at the location server 502, which may be, e.g., an E-SMLC or LMF. For example, the location server 502 may gather data (e.g. for GNSS, RTK, OTDOA, TDOA, AoD, Multi-RTT, and/or ECID) from base station 102 and other sources, e.g., other base stations. The positioning assistance data may be for DL PRS assistance data, TRP location data, or RTD data. For each assistance data element, a separate posSIB-type is defined. The location server 502 may then encode and potentially cipher positioning System Information Block (posSIB) content and scheduling information. Large assistance data elements may be segmented. Any assistance data that is new, i.e., different than provided in a reference posSIB, e.g., previously broadcast posSIB, may be encoded in a separate block of posSIB than used to encode common (i.e., unchanged relative to the reference posSIB) data. The location server 502 may further encode a separate posSIB with reference data associated with the new data, to identify the data with a version number or value tag, e.g., by incrementing a numeric value associated with the positioning assistance data if it is changed with respect to previous positioning assistance data. For example, the ciphering may use the 128-bit Advanced Encryption Standard (AES) algorithm defined by the National Institute of Standards and Technology (NIST) in the United States. For example, AES counter mode may be used. Additionally, the validity time may be used.

At stage 2, the assistance data information is provided to the base station 102 (e.g. via AMF 504 108) and to other base stations using LPPa or NRPPa procedures. The assistance data is provided in separate blocks of posSIB, with reference encoding in one block of posSIB, new or changed positioning assistance data in another block of posSIB, and common (unchanged) positioning assistance data in another block of posSIB.

At stage 3, the base station 102 includes the received assistance data information in positioning System Information (SI) Messages which may be for a Radio Resource Control (RRC) protocol. The separate blocks of posSIB are separately broadcast periodically by the base station 102 (and other base stations) using positioning SI messages. Additionally, the scheduling information may be periodically broadcast by the base station 102 in a SIB 1 message (also referred to as SIB1). The UE 104 may apply a system information acquisition procedure to acquire the assistance data information that is separately broadcasted. The UE 104 only decodes a block of posSIB if it includes positioning assistance data that it has not already obtained, e.g., as determined from the reference encoding.

At stage 4, if the posSIBs were ciphered the location server 502 provides any ciphering keys being used at stage 1 to AMF 504 and other AMFs. For example, the ciphering keys may be provided at stage 4 using a Location Services Application Protocol (LCS-AP) message. Information that is provided for each key at stage 4, which may include an identification of applicable posSIBs, a key value, a key identifier and a time and geographic area of key applicability.

At stage 5, the AMF 504 distributes the ciphering keys to suitably subscribed UEs (e.g. UE 104) using a NAS mobility management procedure such as an Attach or Tracking Area Update. Alternatively, a Supplementary Services procedures could be used to distribute the keys (e.g., a Mobile Originated Located Request (MO-LR)). The keys may be used by a UE (e.g. UE 104) to decipher the assistance data received in a positioning SI message broadcast at stage 3 when ciphering is used.

Figure 6:
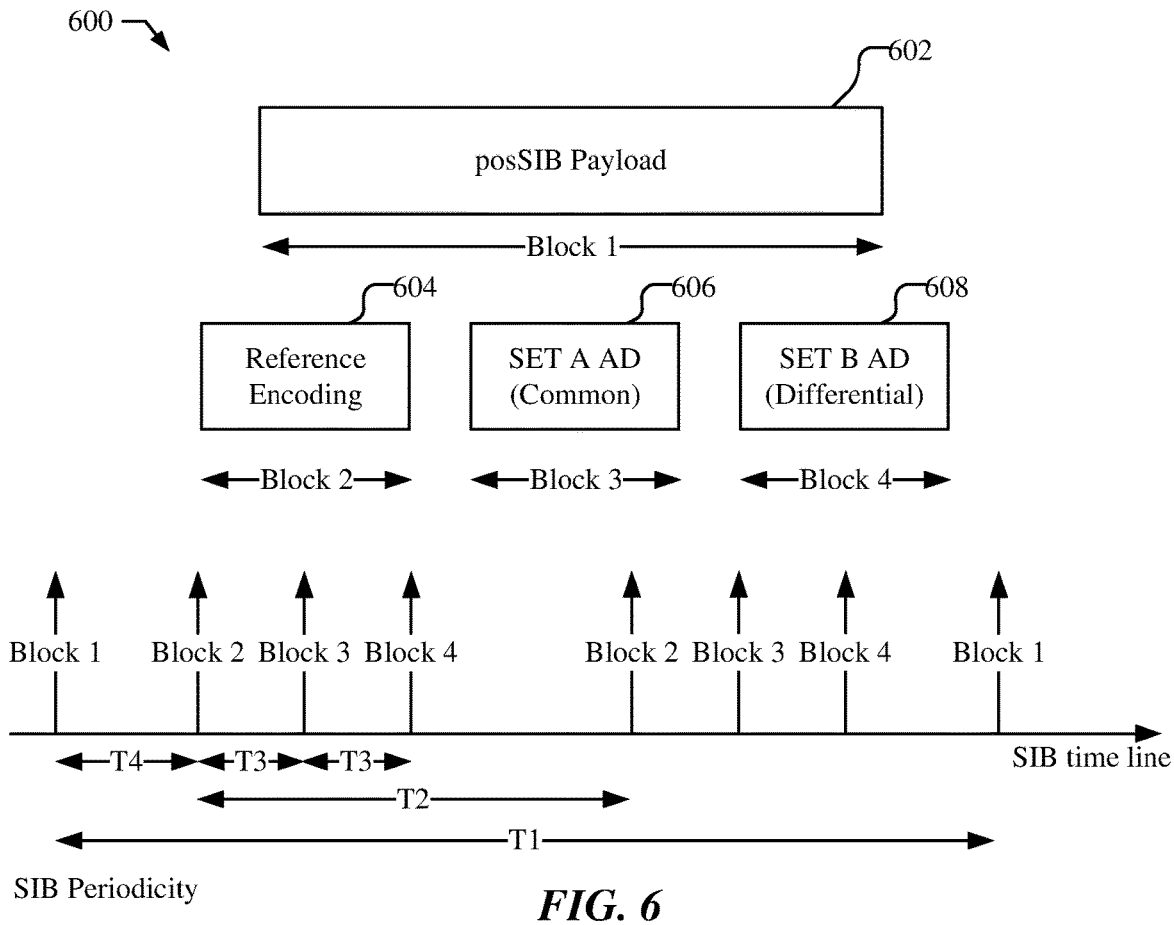
FIG. 6 illustrates posSIB scheduling with differential encoding with new or changed assistance data is encoded and broadcast in a separate block of posSIB.

FIG. 6 illustrates posSIB scheduling 600 with differential encoding, e.g., in which new or changed assistance data is encoded in a separate block of posSIB than assistance data that has not changed with respect to previously transmitted assistance data. With differential encoding, a large posSIB payload, such as Block 1 602 is divided into separate blocks of posSIBs. As illustrated in FIG. 6, a Block 2 604 may include reference encoding, Block 3 606 may include set A assistance data (AD), which is common to previously broadcast assistance data (e.g., a reference posSIB), and Block 4 608 may include Set B AD, which is differential data, e.g., includes new or changed assistance data with respect to previously broadcast assistance data.

Block 1 602 includes a full posSIB payload including common and changed assistance data. In some implementations, Block 1 602 may be the same as a conventional posSIB payload, e.g., such as Block 1 402 shown in FIG. 4, and the information in the posSIB payload may be associated with an expiration timer (expirationTime) and a value tag (systemInfoValueTag). In another implementation, Block 1 602 may be a combination of Block 2 604, Block 3 606, and Block 4 608.

Block 2 604 may include reference encoding that identifies a version number or value tag of assistance data encoded in one or both other blocks of posSIBs. For example, each assistance data element that is encoded in a posSIB is associated with a version number. When assistance data element changes the version number is incremented. The reference encoding in Block 2 604 identifies the current version number of assistance data elements, e.g., in Block 3 606 and Block 4 608, as well as scheduling information. Thus, the reference encoding indicates whether posSIB in Block 4 608 has changed compared to the positioning assistance data included in a reference posSIB, e.g., previously broadcast posSIB. Additionally, in some implementations, the Block 2 604 may further include a validity time, e.g., expirationTime, for the positioning assistance data in the other blocks of posSIBs.

Upon decoding Block 2 604, a UE 104 can determine based on the reference encoding whether the positioning assistance data in Block 3 606 or Block 4 608 has been previously acquired, e.g., in previously broadcast assistance data, or if one or both contains positioning assistance data that the UE 104 has not previously acquired. For example, if all positioning assistance data in Block 3 606 or Block 4 608 has been previously acquired, the UE 104 need not receive or decode these blocks of posSIBs. On the other hand, the UE 104 may determine based on the reference encoding that positioning assistance data in Block 4 608 is changed (or new) relative to previously acquired positioning assistance data, and the UE 104 may receive and decode only the posSIB in Block 4 608, for example, using the scheduling information provided in Block 2 604. Additionally, the UE 104 may not have previously acquired any positioning assistance data, e.g., after turning on, and the UE 104 may acquire all of the positioning assistance data from Block 1 602 or from Block 3 606 and Block 4 608, for example, using the scheduling information provided in Block 2 604.

Block 3 606 includes Set A AD, which is assistance data that is common to previously broadcast assistance data (e.g., a reference posSIB).

Block 4 608 includes Set B AD, which includes new or changed assistance data with respect to previously broadcast assistance data (e.g., a reference posSIB). In some implementations, the Block 4 608 may additionally include assistance that has not changed, but that is associated with the new or changed assistance data. By way of example, a posSIB may include 50 TRPs, where each TRP may have 100 PRS resources, which were previously broadcast, e.g., the reference posSIB. If, for one of the 50 TRPs, 99 of the PRS resources the unchanged with respect to the reference posSIB, the Block 4 608 may include only the PRS resource that changed for that specific TRP. In another implementation, however, in addition to the changed PRS resource, the Block 4 608 may include the complete frequency layer that includes the PRS resource that changed for that specific TRP. In yet another implementation, in addition to the changed PRS resource, the Block 4 608 may include all the PRS resources across all frequency layers for that specific TRP. In another example, the Block 4 608 may include location information for any TRP changed.

As illustrated in FIG. 6, Block 1, Block 2, Block 3, and Block 4 are separately broadcast. Block 1, for example, may be broadcast periodically, e.g., every T1 msec. Block 2, Block 3, and Block 4 are each separately broadcast periodically. For example, Block 2, Block 3, and Block 4 may be broadcast in group with periodicity T2 msec. Block 3 may be separated from Block 2, and Block 4 separated from Block 3 by T3 msec. As illustrated Block 2 may be separated from Block 1 by T4 msec. By broadcasting Block 2, Block 3, and Block 4 in a group with sufficiently small separation T3, the UE 104 may receive any desired block while in an active state, without having to transition between an inactive and active state, thereby increasing efficiency. For example, T3 may be less than 8 radio frames, e.g., less than 80 msec. It should be understood that while FIG. 6 illustrates two separate groups of Block 2, Block 3, and Block 4 within the period T1, there may be more groups if desired.

In operation, the UE 104 may receive and decode Block 2 to determine if there is any new or changed assistance data in Block 4, and only receive and decode Block 4 if there is new or changed assistance data. The UE 104 need not receive and decode Block 3 with the unchanged assistance data unless, e.g., the UE 104 has not yet received assistance data, e.g., the UE 104 first powers on. The UE 104 may receive the full set of assistance data from Block 1, or from Block 3 and Block 4.

In some implementations, there may be no need to broadcast the full posSIB payload in Block 1, as the full set of assistance data may be obtained from Blocks 3 and Block 4.

Figure 7:
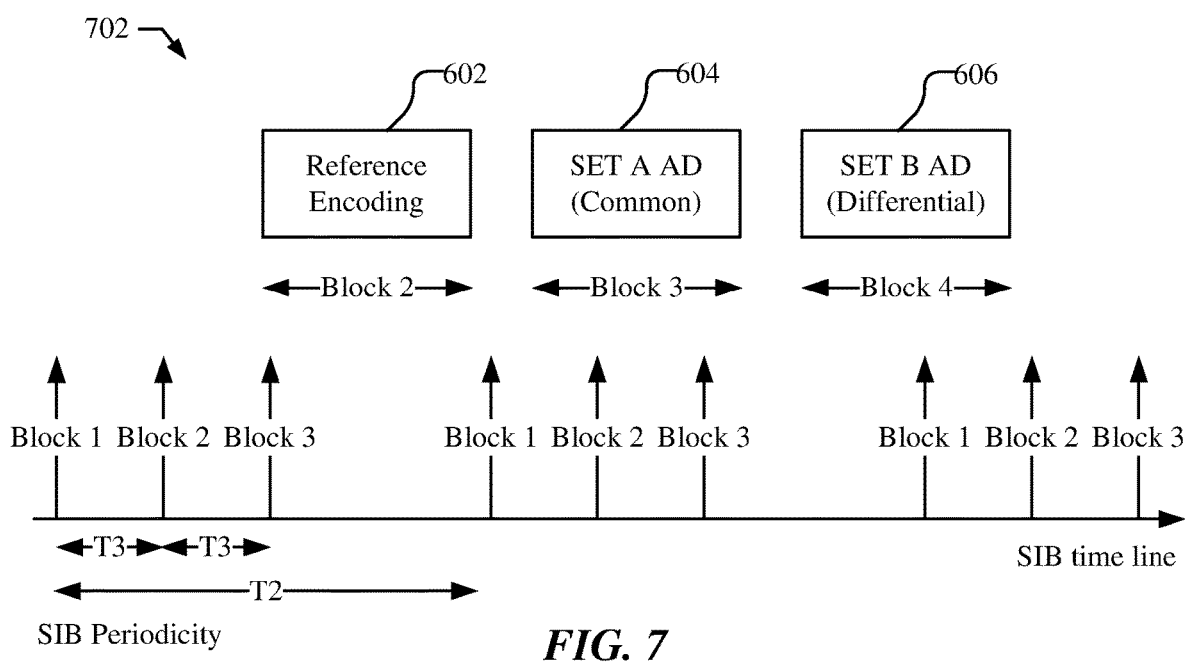
FIG. 7 illustrates posSIB scheduling with differential encoding and broadcast, in which a block of posSIB with a full posSIB payload is not separately broadcast.

FIG. 7, for example, illustrates posSIB scheduling 700 with differential encoding, in which the full posSIB payload is not broadcast in a single block of posSIB. The posSIB scheduling 700 in FIG. 7 includes Block 2 604, Block 3 606, and Block 4 608, described in FIG. 6, but does not include Block 1 602. As illustrated, Block 2, Block 3, and Block 4 may be broadcast in a manner similar to posSIB scheduling 600 shown in FIG. 6, but Block 1 is not transmitted.

In some implementations, there may be no need to broadcast the Block 3 606 with the posSIB that is unchanged from a previous broadcast, as the full set of assistance data may be obtained from Blocks 1 and Block 4.

Figure 8:
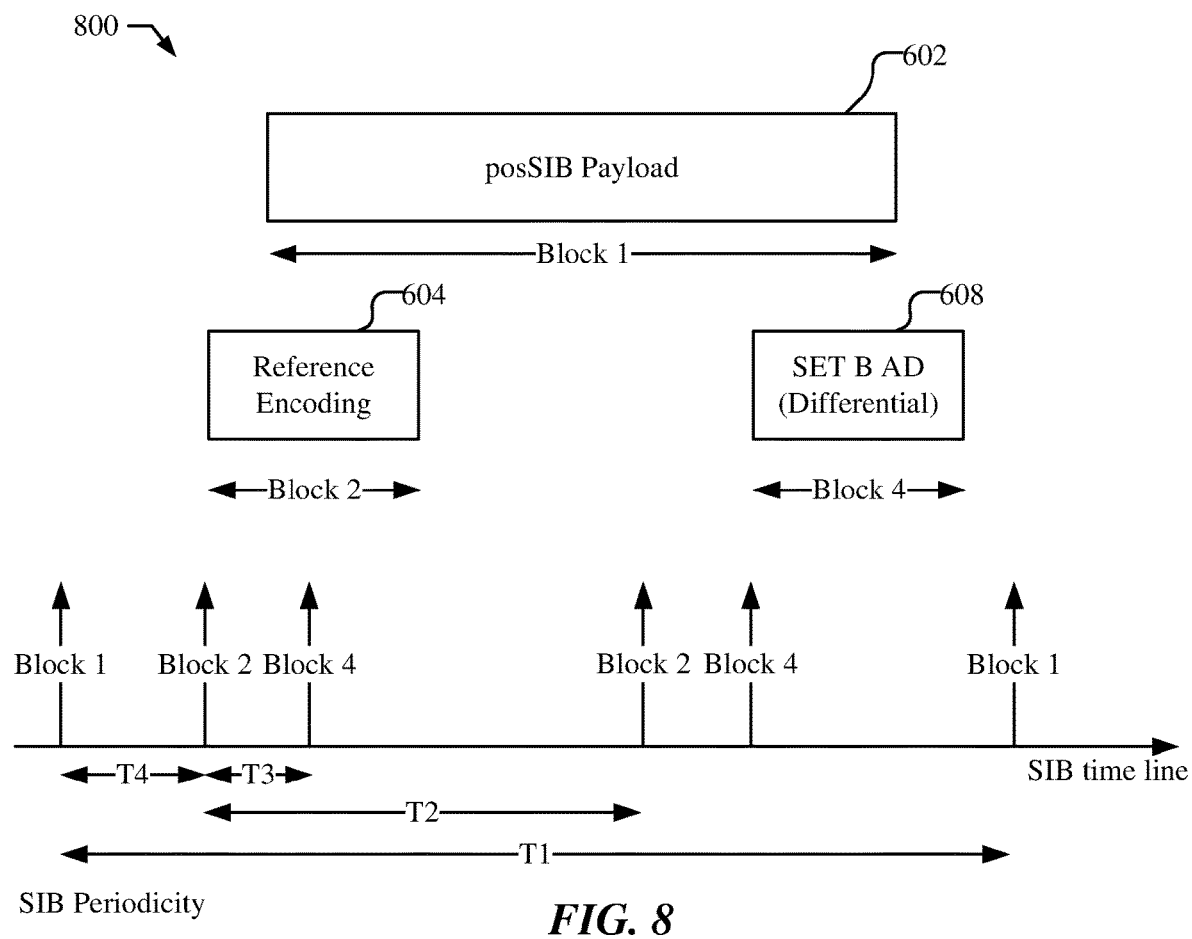
FIG. 8 illustrates posSIB scheduling with differential encoding and broadcast, in which a block of posSIB with unchanged posSIB payload is not separately broadcast.

FIG. 8, for example, illustrates posSIB scheduling 800 with differential encoding, in which the full posSIB payload is broadcast in a single block of posSIB and the unchanged posSIB is not separately broadcast. The posSIB scheduling 800 in FIG. 8 includes Block 1 602, Block 2 604, and Block 4 608, described in FIG. 6, but does not include Block 3 606.

As illustrated, Block 1, Block 2, and Block 4 may be broadcast in a manner similar to posSIB scheduling 600 shown in FIG. 6, but Block 3 is not transmitted. As illustrated, in this implementations (and other implementations if desired) Block 4 separated from Block 2 by T3 msec.

Figure 9:
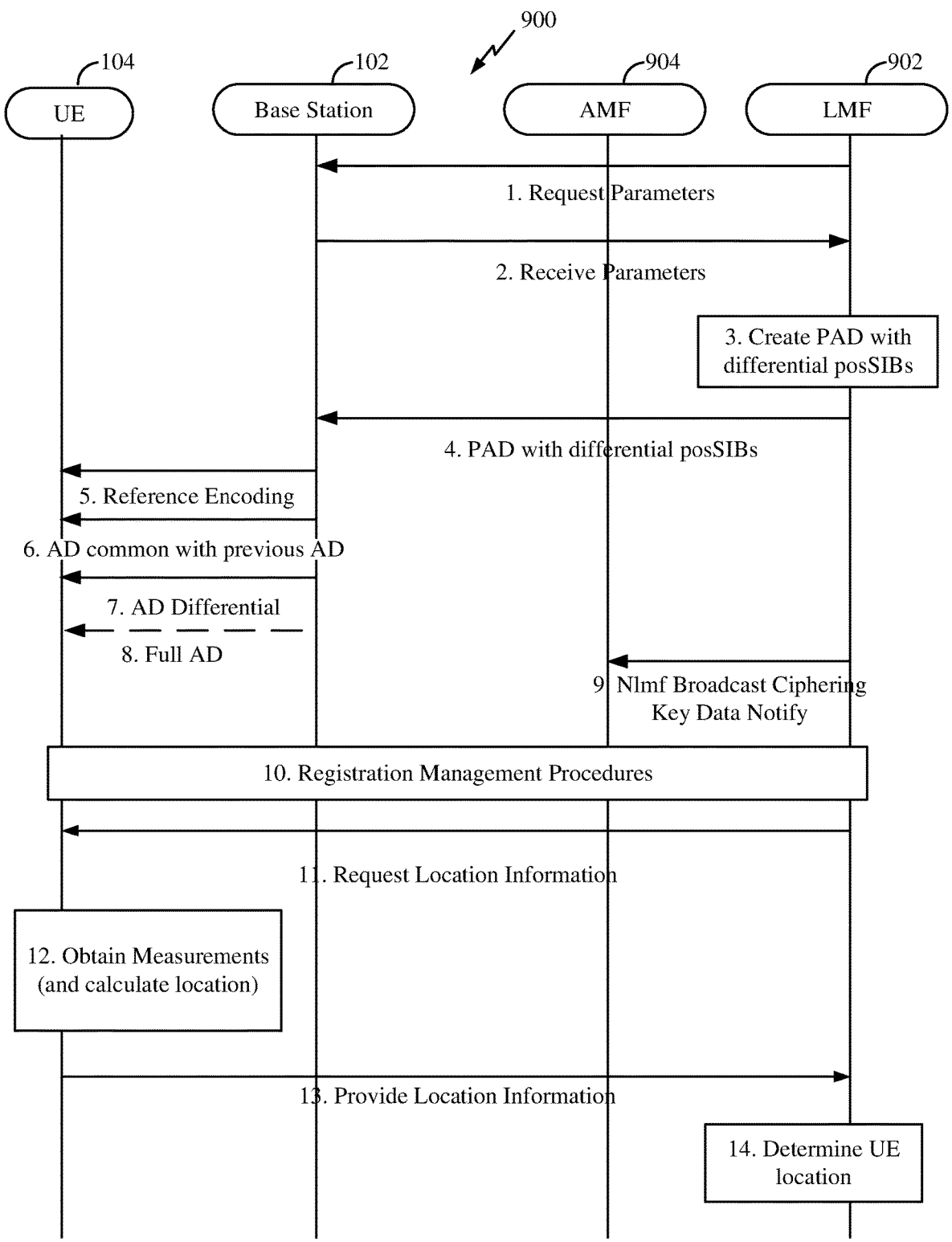
FIG. 9 shows another example of signaling flow for broadcasting positioning assistance data in a differential manner.

FIG. 9 shows an example signaling flow 900 applicable to communication system employing an NR network, such as communication system 100 shown in FIG. 1, for creating and distributing positioning assistance data with differential encoding for use by UE devices such as UE 104 in positioning operations. While only one base station 102 is illustrated, it should be understood that multiple base stations may be present. As pointed out previously, features of FIG. 9 may also be implemented using an LTE network without deviating from claimed subject matter. For example, in an implementation of FIG. 9, base station 102 may be a gNB or eNB, AMF 904 may be replaced by an MME, LMF 902 may be replaced by an E-SMLC, and usage of NRPPa may be replaced with usage of LPPa. Signaling flow 900 may be similar to or the same as signaling flow 500 in FIG. 5, though includes more detail than FIG. 5, and is provided to describe and clarify additional embodiments and techniques.

At stage 1, LMF 902 may request location parameters from base station 102 applicable to positioning methods, such as TDOA, AoD, Multi-RTT, etc., for example.

At stage 2, the base station 102 provides the requested location parameters to the LMF 902. The location information for may comprise antenna locations, cell identities, cell timing, PRS parameters (e.g. PRS bandwidth, frequencies, subframe allocation) for cells for base station 102. The LMF 902 may additionally receive location information (e.g. location parameters) for GNSS positioning, e.g., from another reference source (not shown). For example, location parameters for GNSS positioning may comprise orbital data, almanac data and/or timing data for one or more GNSS satellites or space vehicles (SVs).

At stage 3, based, at least in part, on location parameters obtained from messages base station 102 and any other sources, e.g., other base stations or reference sources, for example, LMF 902 may create positioning assistance data (PAD) for use by UE devices such as UE 104 in obtaining measurements, observations and/or estimates relating to a location of the UE 104 using various positioning techniques (e.g., GNSS, TDOA, AoD, Multi-RTT, etc.). The LMF 902 may identify any portion of the PAD that is new or changed with respect to previously broadcast PAD. The LMF may create one or both of the validity time and version number of value tag for the PAD for use to notify UE 104 of a change to the PAD. For example, the LMF 902 may determine a start time, a duration, an end time or some combination thereof that the PAD is valid. The LMF 902 may also determine a version number or value tag associated with the PAD, e.g., by incrementing a numeric value if the PAD is changed with respect to previous PAD. The value tag The LMF 902 may determine the validity time based on the type of the PAD and/or based on the update rate at location information is provided to the LMF 902. For example, if a reference source is configured to provide differential GNSS data every 30 seconds, the LMF may use a validity time of 30 seconds in the differential GNSS PAD. In another example, if the location information is GNSS orbital parameters (e.g., ephemeris and/or almanac data), the LMF may determine the validity time based on the update rate of the individual GNSSs (e.g., as defined in the respective GNSS specifications).

The LMF 902 may determine the validity time also based on a desired quality of service. For example, for differential GNSS corrections, the accuracy of the location estimate may decrease with the age of the corrections. The LMF 902 may determine for a desired quality of service (e.g., accuracy of the location estimate) the validity time of the differential GNSS corrections PAD. The LMF 902 may receive GNSS observation data (e.g., code and/or carrier phase measurements) from a reference station and may use these measurements together with differential corrections to perform reference position calculations. The LMF 902 may determine an acceptable decrease of positioning accuracy using various validity times of the correction data. The LMF 902 may then select the validity time which provides the desired quality of service (e.g., desired positioning accuracy). In this case, the validity time may exceed the interval at which the assistance data is changing (e.g. the interval between receipt of consecutive reference data updates from reference stations).

In an implementation, PAD created at stage 3 may comprise a subset of PAD to be applied by a UE 104 and not the entire PAD to be used by a UE 104. For example, PAD created at stage 3 may complement or augment PAD provided to UEs from other sources (e.g. provided by LMF 902 point to point using LPP or LPP/LPPe or provided by LMF 902 using LPP or NPP). Also, PAD created at stage 3 may comprise a subset of PAD for one particular LPP positioning method to be used in conjunction with other PAD for the one particular LPP positioning method. In an aspect, PAD created at stage 3 may comprise some or all assistance data defined for the supported UE based or UE assisted position methods.

The LMF 902 may encode the PAD separately for new or changed PAD and common or unchanged PAD relative to previously broadcast PAD in separate blocks of posSIBs. The LMF 902 may further provide reference encoding in a block of posSIB, e.g., Block 2 discussed in FIGS. 6, 7, and 8, indicating which PAD is new or changed and its current value tag or version number, and in some implementations, the validity time. The reference encoding may further include the scheduling information. A separate posSIB may be used to convey different types of PAD, with any new or changed PAD being encoded in the same block of posSIBs, e.g., Block 4 discussed in FIGS. 6, 7, and 8, which may be separate from the block of posSIBs with unchanged PAD, e.g., Block 3 discussed in FIGS. 6 and 7. In some implementations, the LMF 902 may encode both the changed and unchanged PAD in the same block of posSIB, e.g., such as Block 1 discussed in FIGS. 6 and 8.

At stage 4, the LMF 902 may send the PAD, which is encoded in separate blocks of posSIBs at stage 3, to the base station 102. According to an embodiment, certain PAD encoded for posSIBs for transmission may further be encrypted by LMF 902 prior to sending at stage 4 (e.g. using the Advanced Encryption Standard (AES)) according to a ciphering key (e.g. a 128 bit ciphering key). One or more posSIBs may be accompanied by (e.g. may contain) an indication to recipient base station 102 that PAD in certain posSIBs is encrypted. For example, a posSIB may be accompanied by an identifier or identity (ID) for a particular ciphering key that was used to encrypt the PAD in the posSIB to indicate which ciphering key was used.

At stage 5, the base station 102 may broadcast the block of posSIB that includes reference encoding (Block 2 discussed in FIGS. 6, 7, and 8), e.g., indicating the PAD content that has changed with respect to previously broadcast PAD, e.g., a reference posSIB. The UE 104 may receive and decode the block of posSIB.

At stage 6, the base station 102 may broadcast a block of posSIB that includes PAD that is common with previously broadcast PAD, e.g., has not changed relative to a reference posSIB. For example, the block of posSIB broadcast at stage 6 may be Block 3 discussed in FIGS. 6 and 7. In another implementation, the block of posSIB broadcast at stage 6 may be the full set of PAD, i.e., including the new or changed PAD, e.g., Block 1 discussed in FIGS. 6 and 8. The UE 104 may only receive and decode the block of posSIB broadcast at stage 6, e.g., if the UE 104 has not yet received the assistance data, e.g., upon power up.

At stage 7, the base station 102 broadcasts a block of posSIB (Block 4 discussed in FIGS. 6, 7, and 8) that includes PAD that is different from previously broadcast PAD, e.g., a reference posSIB. As discussed above, the block of posSIB that includes PAD that is different from previously broadcast PAD may include only the changed information or may include additionally include assistance data that has not changed but that is related to the changed assistance data, e.g., the frequency layer that includes a changed PRS resource, or the TRP that includes a changed PRS resource. The changed assistance data may include location information for any TRP for which the location information has changed. The base station 102 may broadcast block of the posSIB in stage 7 separately from the block of posSIB that includes reference encoding in stage 7, e.g., with an offset of less than 8 radio frames. The UE 104 may only receive and decode the block of posSIB broadcast at stage 7, e.g., if the UE 104 has not received the changed PAD as indicated in the reference encoding received at stage 5.

At stage 8, which may be optional, the base station 102 may broadcast a block of posSIB (Block 1 discussed in FIGS. 6 and 8) that includes the full payload of PAD, e.g., including changed and unchanged assistance data. For example, if the block of posSIB broadcast at stage 6, includes the full payload of PAD, stage 8 need not be performed. Additionally, if the block of posSIB broadcast at stage 6 includes only PAD that is unchanged, stage 8 may be performed, as discussed at FIG. 6 or need not be performed as discussed at stage 7. The UE 104 may only receive and decode the block of posSIB broadcast at stage 6, e.g., if the UE 104 has not yet received the assistance data, e.g., upon power up.

At stage 9, the LMF 902 may transmit one or more messages comprising ciphering keys used to encrypt PAD in posSIBs created at stage 3 to one or more other nodes in a network. For example, LMF 902 may transmit a message 420 to AMF 904 containing information for ciphering keys used to encrypt PAD in posSIBs. The information for each ciphering key may comprise the ciphering key value (e.g. 128 bits for AES), an identifier for the ciphering key (e.g. an integer, character string or binary value), a time of applicability for the ciphering key (e.g. indicating a time period during which the ciphering key may be used by LMF 902), a geographic area of applicability (e.g. indicating in which part of a network PAD encrypted by the ciphering key will be broadcast in posSIBs), or a combination thereof. In one embodiment, the time of applicability may comprise a start time or an end time, a duration, or a combination thereof. In another embodiment, the geographic area of applicability may comprise at least one cell for the network, at least one location area for the network, at least one tracking area for the network, or at least one geographic area defined using coordinates (e.g. latitude and longitude coordinates).

At stage 10, a registration management procedure is performed. According to an embodiment, during the registration management, the AMF 904 may forward to UEs 104 at least a portion of the information for ciphering keys used to encrypt PAD in posSIBs. Parameters that are forwarded for each ciphering key may comprise the ciphering key value (e.g. 128 bits for AES), an identifier for the ciphering key (e.g. an integer, character string or binary value), a time of applicability for the ciphering key (e.g. indicating a duration during which the ciphering key may be used by LMF 902), a geographic area of applicability (e.g. indicating in which part of a network PAD encrypted by the ciphering key may be broadcast in posSIBs), or a combination thereof. For example, AMF 904 may forward at least a portion of the contents from stage 9 to UE 104 in the course of a particular procedure such as an Attach procedure, Tracking Area Update (TAU) procedure or Service Request mobility management procedure, just to provide a few examples. Here, AMF 904 may forward at least a portion of the contents of stage 9 (e.g., ciphering keys used to encrypt PAD in posSIBs along with identifiers of the ciphering keys, a time of applicability, a geographic area of applicability, or a combination thereof) to UE 104 in a Non-Access Stratum (NAS) Attach Accept message, a NAS TAU Accept message, a NAS Authentication Response message, a Downlink NAS Transport message, a Downlink Generic NAS Transport message and/or a NAS Service Accept message.

In one embodiment, in order to avoid sending information for ciphering keys used to encrypt PAD to a UE that does not have a subscription for receiving ciphered PAD, AMF 904 may only send the information for ciphering keys to UE 104 using registration management procedure if subscription data for UE 104 (e.g. received from network node) indicate that UE 104 has a subscription to receive ciphered PAD. Further, AMF 904 may only send ciphering key information to UE 104 for particular posSIBs for which UE 104 has a subscription to receive ciphered PAD. Furthermore, in order to avoid sending information for ciphering keys used to encrypt PAD to a UE 104 that either does not need the information or has previously received the information, AMF 904 may only send the information for ciphering keys to UE 104 if UE 104 provides a request or indication that the ciphering key information is needed. For example, in an embodiment of registration management procedure, UE 104 may include an indication that ciphering key information for PAD is needed or requested. The indication may be included by UE 104 when UE 104 needs the PAD (e.g. to assist location of UE 104) and when any previous ciphering key information provided to UE 104 by AMF 904 (or by another AMF) is no longer valid. For example, UE 104 may determine that previous ciphering key information provided to UE 104 by AMF 904 (or by another MME) is no longer valid when a time of applicability for the previous ciphering key information has expired, when UE 104 moves outside a geographic area of applicability for the previous ciphering key information, or when UE 104 receives one or more posSIBs broadcast by base station 102 (or another base station) which contain ciphered PAD and an indication that the PAD is ciphered using a ciphering key for which UE 104 does not have ciphering key information. AMF 904 may then only send the ciphering key information to UE 104 when the indication is received from UE 104, which may avoid using signaling resources to unnecessarily send ciphering key information.

At stage 11, the LMF 902 may send a Request Location Information message to the UE 104. Here, the LMF 902 may request location-related measurements (e.g. measurements for A-GNSS, TDOA, AoD, Multi-RTT, etc.). In some embodiments, the Request Location Information message may request that UE 104 compute a location estimate from these measurements (e.g. if the position method is UE based) and may also include a requested accuracy for any location measurements or location estimate and/or a maximum response time.

At stage 12, the UE 104 may obtain measurements requested at stage 11. The location related measurements obtained by UE 104 may be obtained for RF signals transmitted by base station 102 (another other base stations) and/or satellites. For example, location related measurements may include measurements of RSTD obtained by measuring PRS or other reference signals (e.g. CRS signals) transmitted by base station 102, measurements of RTT obtained by measuring signals transmitted from and/or to base station 102 (and other base stations), and/or measurements of pseudorange, code phase or carrier phase obtained by measuring one or more navigation signals transmitted by each of one or more satellites. In some embodiments, UE 104 may also calculate a location estimate based on the obtained location measurements. The UE 104 may use the PAD broadcast by base station 102 at stages 5, 6, 7, and 8 to help obtain the location measurements and/or determine any location estimate.

At stage 13, the UE 104 sends information indicative of one or more location-related measurements and/or a location estimate, to the LMF 902 in a Provide Location Information message.

At stage 14, the LMF 902 can use the measurement information received at stage 13 (comprising one or more location-related measurements or a location estimate) to determine (e.g. calculate or verify) an estimated location of the UE 104.

Figure 10:
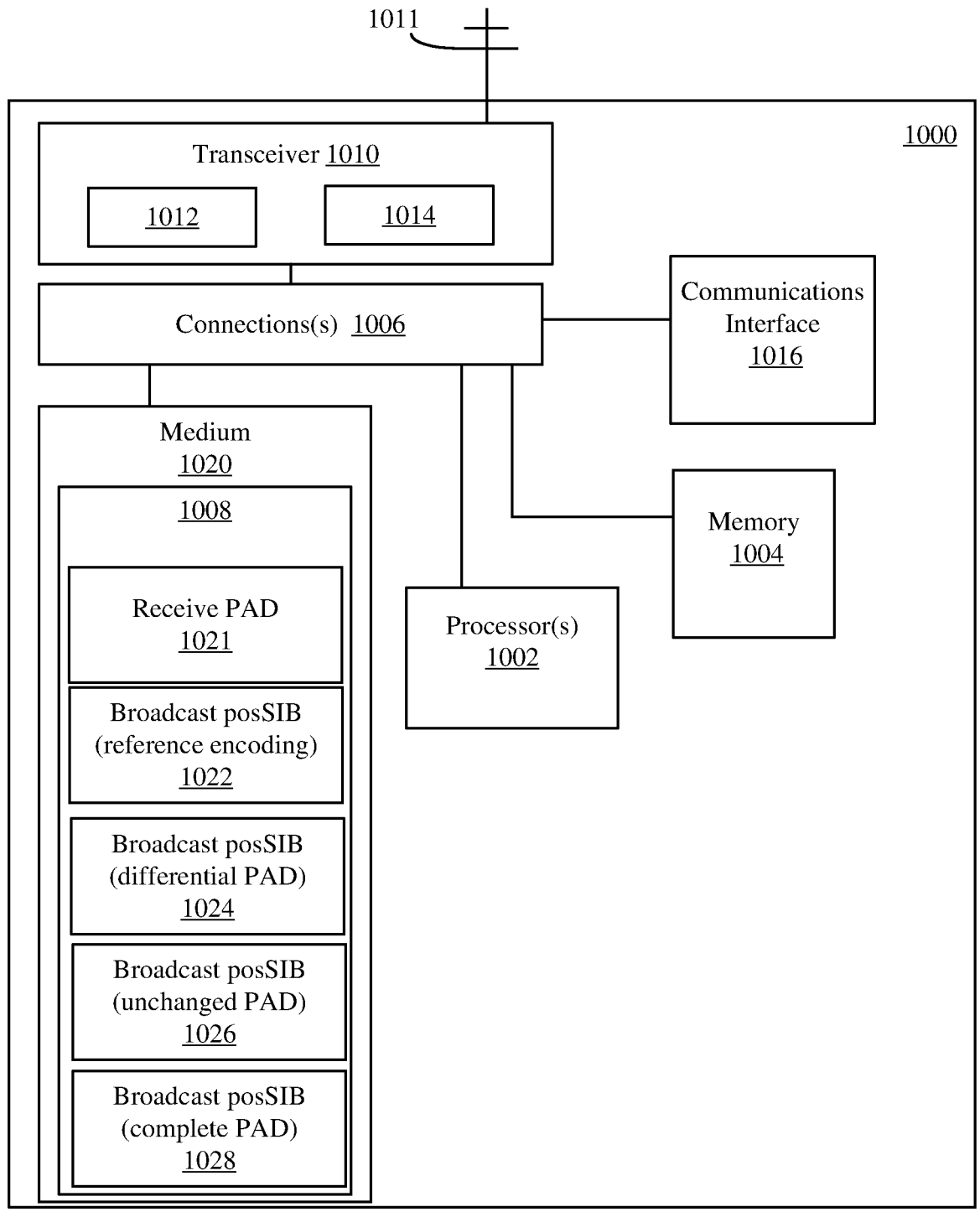
FIG. 10 shows a schematic block diagram illustrating certain exemplary features of a base station enabled to support broadcast of positioning assistance data that is differentially encoded.

FIG. 10 shows a schematic block diagram illustrating certain exemplary features of a base station 1000, e.g., base station 102 in FIG. 1, enabled to support broadcast of positioning assistance data that is differentially encoded, as described herein. The base station 1000 may be an eNB or gNB. The base station 1000 may perform the process flow shown in FIG. 13. Base station 1000 may, for example, include one or more processors 1002, memory 1004, an external interface, which may include a transceiver 1010 (e.g., wireless network interface) and a communications interface 1016 (e.g., wireline or wireless network interface to other base stations and/or entities in the core network such as a location server), which may be operatively coupled with one or more connections 1006 (e.g., buses, lines, fibers, links, etc.) to non-transitory computer readable medium 1020 and memory 1004. The base station 1000 may further include additional items, which are not shown, such as a user interface that may include e.g., a display, a keypad or other input device, such as virtual keypad on the display, through which a user may interface with the base station. In certain example implementations, all or part of base station 1000 may take the form of a chipset, and/or the like. Transceiver 1010 may, for example, include a transmitter 1012 enabled to transmit one or more signals over one or more types of wireless communication networks and a receiver 1014 to receive one or more signals transmitted over the one or more types of wireless communication networks. The communications interface 1016 may be a wired or wireless interface capable of connecting to other base stations in the RAN or network entities, such as a location server 172 shown in FIG. 1.

In some embodiments, base station 1000 may include antenna 1011, which may be internal or external. Antenna 1011 may be used to transmit and/or receive signals processed by transceiver 1010. In some embodiments, antenna 1011 may be coupled to transceiver 1010. In some embodiments, measurements of signals received (transmitted) by base station 1000 may be performed at the point of connection of the antenna 1011 and transceiver 1010. For example, the measurement point of reference for received (transmitted) RF signal measurements may be an input (output) terminal of the receiver 1014 (transmitter 1012) and an output (input) terminal of the antenna 1011. In a base station 1000 with multiple antennas 1011 or antenna arrays, the antenna connector may be viewed as a virtual point representing the aggregate output (input) of multiple antennas. In some embodiments, base station 1000 may measure received signals including signal strength and TOA measurements and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of base station 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in base station 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors. A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in base station 1000 is merely exemplary, and as such the functionality of the modules and/or data structures may be combined, separated, and/or be structured in different ways depending upon the implementation of the base station 1000.

The medium 1020 and/or memory 1004 may include a receive PAD module 1021 that when implemented by the one or more processors 1002 configures the one or more processors 1002 to receive from a location server, via the transceiver 1010, positioning assistance data (PAD), which may include separate blocks of posSIB including reference encoding, differential PAD, unchanged PAD, and the complete PAD (including differential and unchanged PAD), e.g., as discussed in FIGS. 6-9.

The medium 1020 and/or memory 1004 may include a broadcast posSIB (reference encoding) module 1022 that when implemented by the one or more processors 1002 configures the one or more processors 1002 to broadcast a block of posSIB that includes the reference encoding, e.g., as discussed in FIGS. 6-9.

The medium 1020 and/or memory 1004 may include a broadcast posSIB (differential PAD) module 1024 that when implemented by the one or more processors 1002 configures the one or more processors 1002 to broadcast, via transceiver 1010, a block of posSIB that includes positioning assistance data that has changed relative to a previous broadcast block of posSIB, e.g., as discussed in FIGS. 6-9.

The medium 1020 and/or memory 1004 may include a broadcast posSIB (unchanged PAD) module 1026 that when implemented by the one or more processors 1002 configures the one or more processors 1002 to broadcast, via transceiver 1010, a block of posSIB that includes positioning assistance data that is unchanged relative to a previous broadcast block of posSIB, e.g., as discussed in FIGS. 6-9.

The medium 1020 and/or memory 1004 may include a broadcast posSIB (complete PAD) module 1028 that when implemented by the one or more processors 1002 configures the one or more processors 1002 to broadcast, via transceiver 1010, a block of posSIB that includes the complete positioning assistance data, e.g., including both differential and unchanged PAD relative to a previous broadcast block of posSIB, e.g., as discussed in FIGS. 6-9.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support broadcast of differential positioning assistance data in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by one or more processors 1002 may be operatively enabled to perform all or portions of the example operations as described herein. Computer readable medium 1020 may be a part of memory 1004.

Figure 11:
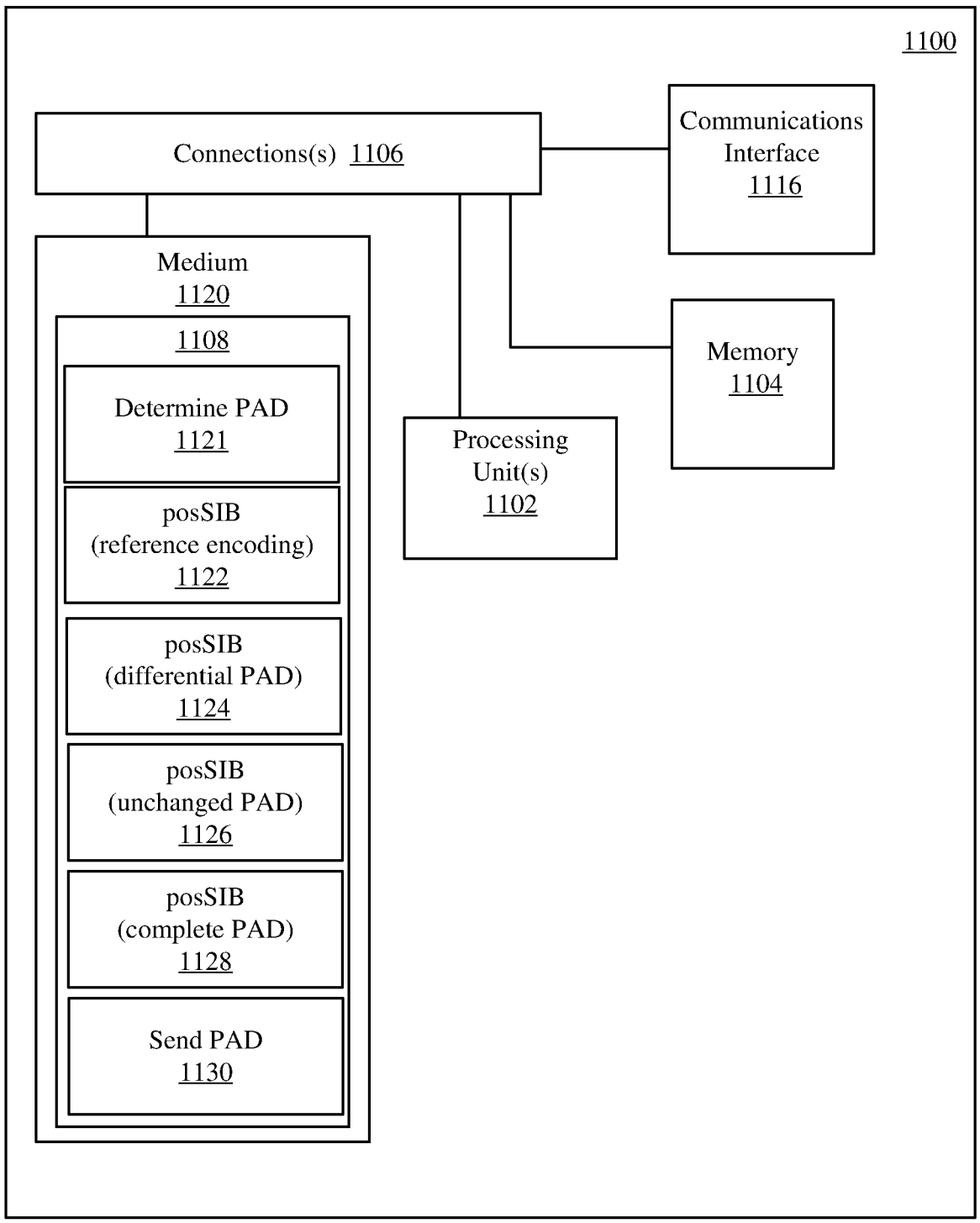
FIG. 11 shows a schematic block diagram illustrating certain exemplary features of a location server enabled to support broadcast of positioning assistance data that is differentially encoded.

FIG. 11 shows a schematic block diagram illustrating certain exemplary features of a location server 1100, e.g., location server 172, enabled to support broadcast of positioning assistance data that is differentially encoded, as described herein. The location server 1100 may be, e.g., a E-SMLC or LMF. The location server 1100 may perform the process flow shown in FIG. 14. Location server 1100 may, for example, include one or more processors 1102, memory 1104, and a communications interface 1116 (e.g., wireline or wireless network interface to other network entities, such as core network entities and base stations), which may be operatively coupled with one or more connections 1106 (e.g., buses, lines, fibers, links, etc.) to non-transitory computer readable medium 1120 and memory 1104. The base station 1100 may further include additional items, which are not shown, such as a user interface that may include e.g., a display, a keypad or other input device, such as virtual keypad on the display, through which a user may interface with the location server. In certain example implementations, all or part of location server 1100 may take the form of a chipset, and/or the like. The communications interface 1116 may be a wired or wireless interface capable of connecting to base stations in the RAN or network entities, such as an AMF or MME.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of location server 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in location server 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors. A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in location server 1100 is merely exemplary, and as such the functionality of the modules and/or data structures may be combined, separated, and/or be structured in different ways depending upon the implementation of the location server 1100.

The medium 1120 and/or memory 1104 may include a determine PAD module 1121 that when implemented by the one or more processors 1102 configures the one or more processors 1102 to determining positioning assistance data (PAD) that is to be broadcast, including differential PAD and unchanged PAD, e.g., as discussed in FIGS. 6-9.

The medium 1120 and/or memory 1104 may include a posSIB (reference encoding) module 1122 that when implemented by the one or more processors 1102 configures the one or more processors 1102 to produce a block of posSIB that includes the reference encoding indicating the PAD that has changed and scheduling information, e.g., as discussed in FIGS. 6-9.

The medium 1120 and/or memory 1104 may include a posSIB (differential PAD) module 1124 that when implemented by the one or more processors 1102 configures the one or more processors 1102 to produce a block of posSIB that includes the positioning assistance data that has changed relative to a previous broadcast block of posSIB, e.g., as discussed in FIGS. 6-9.

The medium 1120 and/or memory 1104 may include a posSIB (unchanged PAD) module 1126 that when implemented by the one or more processors 1102 configures the one or more processors 1102 to produce a block of posSIB that includes positioning assistance data that is unchanged relative to a previous broadcast block of posSIB, e.g., as discussed in FIGS. 6-9.

The medium 1120 and/or memory 1104 may include a posSIB (complete PAD) module 1128 that when implemented by the one or more processors 1102 configures the one or more processors 1102 to produce a block of posSIB that includes the complete positioning assistance data, e.g., including both differential and unchanged PAD relative to a previous broadcast block of posSIB, e.g., as discussed in FIGS. 6-9.

The medium 1120 and/or memory 1104 may include a send PAD module 1130 that when implemented by the one or more processors 1102 configures the one or more processors 1102 to send, via communications interface 1116, the blocks the posSIBs to the base station for broadcasting by the base station, e.g., as discussed in FIGS. 6-9.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support broadcast of differential positioning assistance data in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a communications interface 1116 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
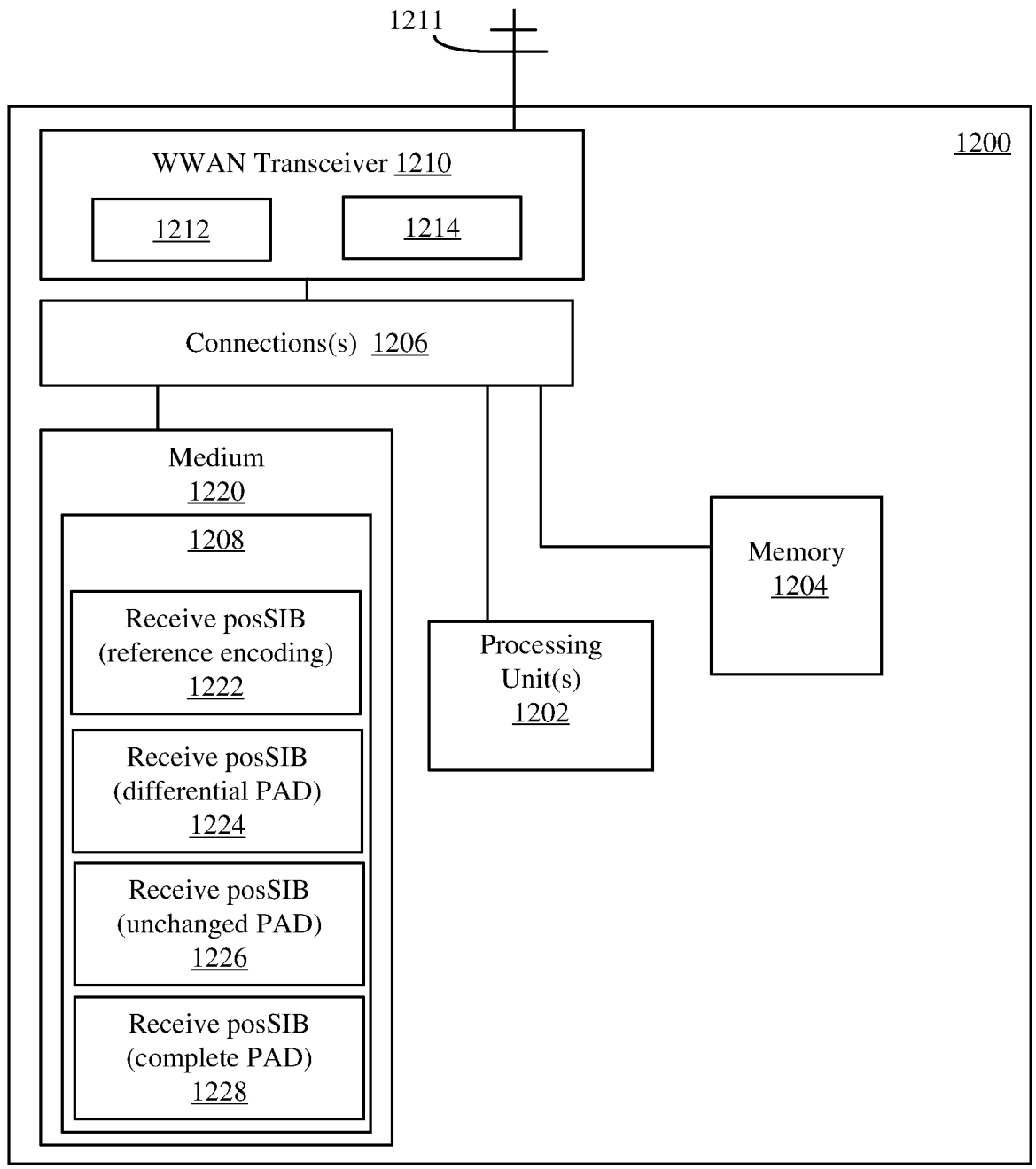
FIG. 12 shows a schematic block diagram illustrating certain exemplary features of a UE enabled to support broadcast of positioning assistance data that is differentially encoded.

FIG. 12 shows a schematic block diagram illustrating certain exemplary features of a UE 1200, e.g., which may be UE 104 shown in FIG. 1, enabled to support broadcast of positioning assistance data that is differentially encoded, as described herein. The UE 1200 may perform the process flow shown in FIG. 15. UE 1200 may, for example, include one or more processors 1202, memory 1204, an external interface such as a transceiver 1210 (e.g., wireless network interface), which may be operatively coupled with one or more connections 1206 (e.g., buses, lines, fibers, links, etc.) to non-transitory computer readable medium 1220 and memory 1204. The UE 1200 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1200 may take the form of a chipset, and/or the like. Transceiver 1210 may, for example, include a transmitter 1212 enabled to transmit one or more signals over one or more types of wireless communication networks and a receiver 1214 to receive one or more signals transmitted over the one or more types of wireless communication networks.

In some embodiments, UE 1200 may include antenna 1211, which may be internal or external. UE antenna 1211 may be used to transmit and/or receive signals processed by transceiver 1210. In some embodiments, UE antenna 1211 may be coupled to transceiver 1210. In some embodiments, measurements of signals received (transmitted) by UE 1200 may be performed at the point of connection of the UE antenna 1211 and transceiver 1210. For example, the measurement point of reference for received (transmitted) RF signal measurements may be an input (output) terminal of the receiver 1214 (transmitter 1212) and an output (input)

terminal of the UE antenna 1211. In a UE 1200 with multiple UE antennas 1211 or antenna arrays, the antenna connector may be viewed as a virtual point representing the aggregate output (input) of multiple UE antennas. In some embodiments, UE 1200 may measure received signals including signal strength and TOA measurements and the raw measurements may be processed by the one or more processors 1202.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of UE 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in UE 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors. A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in UE 1200 is merely exemplary, and as such the functionality of the modules and/or data structures may be combined, separated, and/or be structured in different ways depending upon the implementation of the UE 1200.

The medium 1220 and/or memory 1204 may include a receive posSIB (reference encoding) module 1222 that when implemented by the one or more processors 1202 configures the one or more processors 1202 to receive a block of posSIB that includes the reference encoding, e.g., as discussed in FIGS. 6-9.

The medium 1220 and/or memory 1204 may include a receive posSIB (differential PAD) module 1224 that when implemented by the one or more processors 1202 configures the one or more processors 1202 to receive, via transceiver 1210, a block of posSIB that includes positioning assistance data that has changed relative to a previous broadcast block of posSIB, e.g., as discussed in FIGS. 6-9.

The medium 1220 and/or memory 1204 may include a receive posSIB (unchanged PAD) module 1226 that when implemented by the one or more processors 1202 configures the one or more processors 1202 to receive, via transceiver 1210, a block of posSIB that includes positioning assistance data that is unchanged relative to a previous broadcast block of posSIB, e.g., as discussed in FIGS. 6-9.

The medium 1220 and/or memory 1204 may include a receive posSIB (complete PAD) module 1228 that when implemented by the one or more processors 1202 configures the one or more processors 1202 to receive, via transceiver 1210, a block of posSIB that includes the complete positioning assistance data, e.g., including both differential and unchanged PAD relative to a previous broadcast block of posSIB, e.g., as discussed in FIGS. 6-9.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support broadcast of differential positioning assistance data in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a transceiver 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

Figure 13:
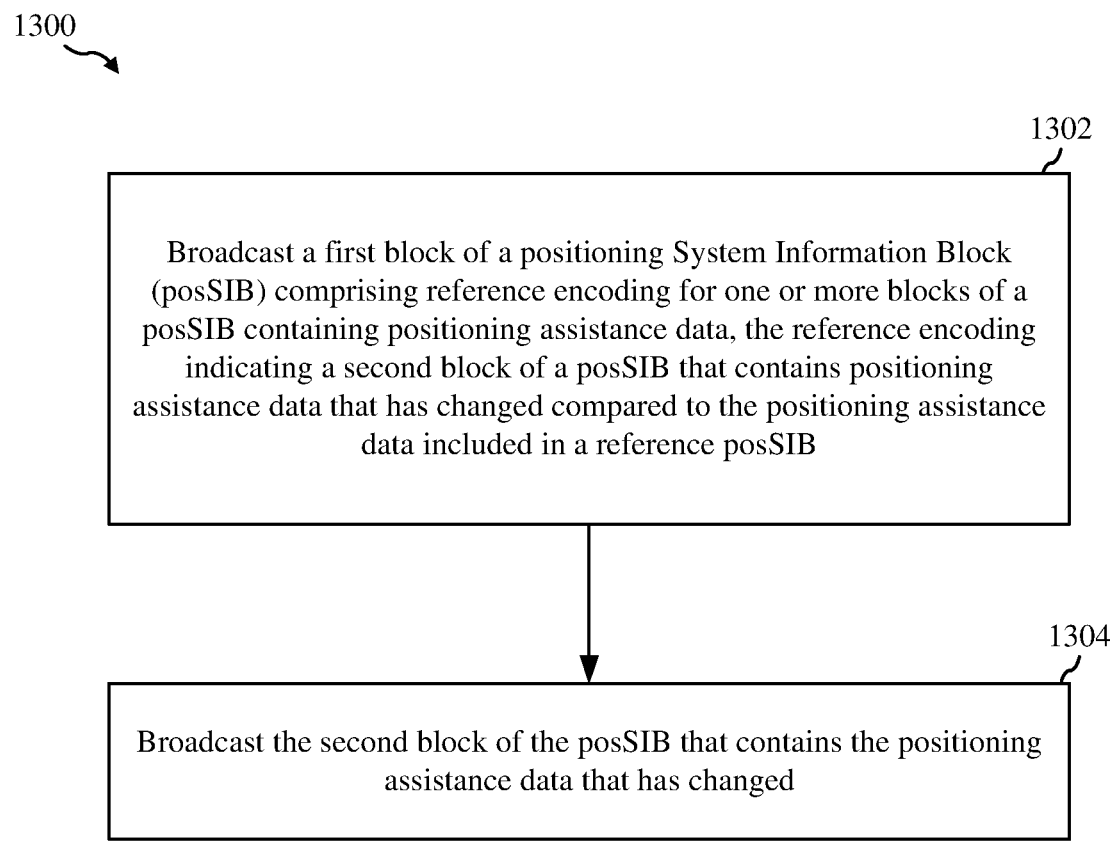
FIG. 13 shows a flowchart for an exemplary method for supporting broadcast of positioning assistance data in a wireless network performed by a base station.

FIG. 13 shows a flowchart for an exemplary method 1300 for supporting broadcast of positioning assistance data in a wireless network performed by a base station in a wireless network, such as base station 102, in a manner consistent with disclosed implementation.

At block 1302, the base station broadcasts a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB, e.g., as discussed in FIGS. 6, 7, 8, and stage 5 of FIG. 9. In some implementations, the reference encoding further indicates schedule information for the second block of the posSIB, e.g., as discussed in FIGS. 6, 7, 8, and stage 5 of FIG. 9. A means for broadcasting a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB may include, e.g., the wireless transceiver 1010 and one or more processors 1002 with dedicated hardware or implementing executable code or software instructions in memory 1004 and/or medium 1020, such as the broadcast posSIB (reference encoding) 1022, in base station 1000 shown in FIG. 10.

At block 1304, the base station broadcasts the second block of the posSIB that contains the positioning assistance data that has changed, e.g., as discussed in FIGS. 6, 7, 8, and stage 7 of FIG. 9. A means for broadcasting the second block of the posSIB that contains the positioning assistance data that has changed may be, e.g., the wireless transceiver 1010 and one or more processors 1002 with dedicated hardware or implementing executable code or software instructions in memory 1004 and/or medium 1020, such as broadcast posSIB (differential PAD) 1024, in base station 1000 shown in FIG. 10.

In some implementations, the base station may broadcast a third block of a posSIB that contains the positioning assistance data that has not changed compared to the positioning assistance data included in the reference posSIB, e.g., as discussed in FIGS. 6, 7, 8, and stages 6 and 8 of FIG. 9. A means for broadcasting a third block of a posSIB that contains the positioning assistance data that has not changed compared to the positioning assistance data included in the reference posSIB may be, e.g., the wireless transceiver 1010 and one or more processors 1002 with dedicated hardware or implementing executable code or software instructions in memory 1004 and/or medium 1020, such as broadcast posSIB (unchanged PAD) 1028, in base station 1000 shown in FIG. 10.

In one implementation, the third block of the posSIB may be broadcast separately from the first block of the posSIB and the second block of the posSIB, e.g., as discussed in FIGS. 6, and 7 and stage 6 of FIG. 9. The base station, for example, may broadcast a fourth block of a posSIB that contains the positioning assistance data that has not changed and the positioning assistance data that has changed, e.g., as discussed in FIG. 6 and stages 5, 6, 7, and 8 of FIG. 9. A means for broadcasting a fourth block of a posSIB that contains the positioning assistance data that has not changed and the positioning assistance data that has changed may be, e.g., the wireless transceiver 1010 and one or more processors 1002 with dedicated hardware or implementing executable code or software instructions in memory 1004 and/or medium 1020 in base station 1000 shown in FIG. 10. In one implementation, the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB, e.g., as discussed in FIG. 6.

In one implementation, the third block of the posSIB may further contain the positioning assistance data that has changed compared to the positioning assistance data included in the reference posSIB, e.g., as discussed in FIGS. 6 and 8 and stage 6 of FIG. 9. For example, the first block of the posSIB, the second block of the posSIB and the third block of the posSIB are broadcast periodically, wherein the third block of the posSIB is broadcast less frequently than the first block of the posSIB and the second block of the posSIB, e.g., as discussed in FIG. 6.

In one implementation, the second block of the posSIB may be broadcast separately from the first block of the posSIB, e.g., as discussed in FIGS. 6, 7, 8, and stages 5 and 7 of FIG. 9. For example, the first block of the posSIB and the second block of the posSIB may be broadcast separately with an offset of less than 8 radio frames, e.g., as discussed in FIG. 6.

In one implementation, the positioning assistance data is for one of downlink positioning reference signal (PRS) assistance data or transmission reception point (TRP) location data or Real Time Difference (RTD) data, e.g., as discussed in FIG. 6.

In one implementation, the second block of the posSIB contains complete PRS configuration information for any transmission reception points (TRPs) for which at least one PRS configuration has changed compared to the reference posSIB, e.g., as discussed in FIG. 6 and at stage 7 of FIG. 9.

In one implementation, the second block of the posSIB contains PRS configuration information for any transmission reception points (TRPs) for which corresponding PRS configuration has changed compared to the reference posSIB, e.g., as discussed in FIG. 6 and at stage 7 of FIG. 9.

In one implementation, the second block of the posSIB contains complete PRS configuration information for any frequency layer for which at least one PRS configuration has changed compared to the reference posSIB, e.g., as discussed in FIG. 6 and at stage 7 of FIG. 9.

In one implementation, the second block of the posSIB contains location information for any transmission reception points (TRPs) for which the location information of the same TRP included in the reference posSIB is different, e.g., as discussed in FIG. 6 and at stage 7 of FIG. 9.

In one implementation, the reference encoding in the first block of the posSIB further contains a validity time for each of the one or more blocks of the posSIB, e.g., as discussed in FIG. 6 and stage 3 of FIG. 9.

Figure 14:
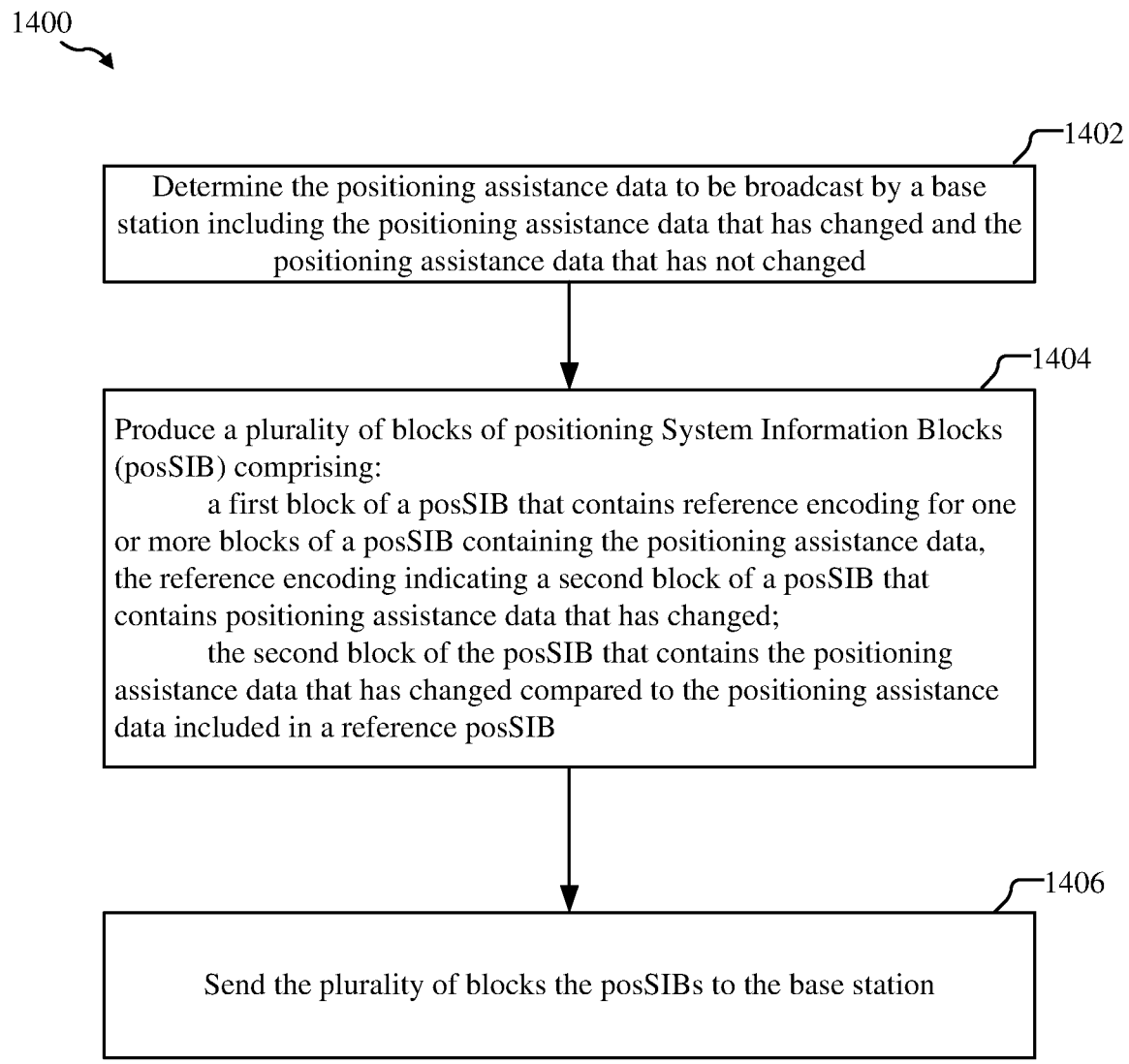
FIG. 14 shows a flowchart for an exemplary method for supporting broadcast of positioning assistance data in a wireless network performed by a location server.

FIG. 14 shows a flowchart for an exemplary method 1400 for supporting broadcast of positioning assistance data in a wireless network performed by a location server in a wireless network, such as location server 172, in a manner consistent with disclosed implementation.

At block 1402, the location server may determine the positioning assistance data to be broadcast by a base station including the positioning assistance data that has changed and the positioning assistance data that has not changed, e.g., as discussed in FIGS. 6, 7, 8, and stage 2 of FIG. 9. A means for determining the positioning assistance data to be broadcast by a base station including the positioning assistance data that has changed and the positioning assistance data that has not changed may include, e.g., the communications interface 1116 and one or more processors 1102 with dedicated hardware or implementing executable code or software instructions in memory 1104 and/or medium 1120 in location server 1100, such as determine PAD module 1121, shown in FIG. 11.

At block 1404, the location server may produce a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB, e.g., as discussed in FIGS. 6, 7, 8, and stage 3 of FIG. 9. In some implementations, the reference encoding may further indicate schedule information for the second block of the posSIB, e.g., as discussed in FIGS. 6, 7, 8, and stage 3 of FIG. 9. In some implementations, the plurality of blocks of posSIBs may further include a third block of a posSIB that contains at least the positioning assistance data that has not changed compared to the positioning assistance data included in the reference posSIB, e.g., as discussed in FIGS. 6, 7, 8, and stage 3 of FIG. 9. A means for producing a plurality of blocks of positioning System Information Blocks (posSIB) may include, e.g., the communications interface 1116 and one or more processors 1102 with dedicated hardware or implementing executable code or software instructions in memory 1104 and/or medium 1120, such as the posSIB modules 1122, 124, and 1126, in location server 1100 shown in FIG. 11.

At block 1406, the location server may send the plurality of blocks the posSIBs to the base station, e.g., as discussed in FIGS. 6, 7, 8, and stage 4 of FIG. 9. A means for sending the plurality of blocks the posSIBs to the base station, wherein the base station broadcasts the second block of the posSIB separately from the first block of the posSIB may include, e.g., the communications interface 1116 and one or more processors 1102 with dedicated hardware or implementing executable code or software instructions in memory 1104 and/or medium 1120, such as the send PAD module 1130, in location server 1100 shown in FIG. 11.

In one implementation, the base station broadcasts the third block of the posSIB separately from the first block of the posSIB and the second block of the posSIB, e.g., as discussed in FIGS. 6, and 7 and stage 6 of FIG. 9. In one example, the plurality of blocks of the posSIBs further comprises a fourth block of a posSIB that contains the positioning assistance data that has not changed and the positioning assistance data that has changed, e.g., as discussed in FIG. 6 and stages 5, 6, 7, and 8 of FIG. 9. In one implementation, the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB, e.g., as discussed in FIG. 6.

In one implementation, the third block of the posSIB further contains the positioning assistance data that has changed compared to the positioning assistance data included in the reference posSIB, e.g., as discussed in FIGS. 6 and 8 and stage 6 of FIG. 9. For example, the base station broadcasts the first block of the posSIB, the second block of the posSIB and the third block of the posSIB periodically, wherein the third block of the posSIB is broadcast less frequently than the first block of the posSIB and the second block of the posSIB, e.g., as discussed in FIG. 6.

In one implementation, the base station may broadcast the second block of the posSIB separately from the first block of the posSIB, e.g., as discussed in FIGS. 6, 7, 8, and stages 5 and 7 of FIG. 9. For example, the base station broadcasts the first block of the posSIB and the second block of the posSIB separately with an offset of less than 8 radio frames, e.g., as discussed in FIG. 6.

In one implementation, the positioning assistance data is for one of downlink positioning reference signal (PRS) assistance data or transmission reception point (TRP) location data or Real Time Difference (RTD) data, e.g., as discussed in FIG. 6.

In one implementation, the second block of the posSIB contains complete PRS configuration information for any transmission reception points (TRPs) for which at least one PRS configuration has changed compared to the reference posSIB, e.g., as discussed in FIG. 6 and at stage 7 of FIG. 9.

In one implementation, the second block of the posSIB contains PRS configuration information for any transmission reception points (TRPs) for which corresponding PRS configuration has changed compared to the reference posSIB, e.g., as discussed in FIG. 6 and at stage 7 of FIG. 9.

In one implementation, the second block of the posSIB contains complete PRS configuration information for any frequency layer for which at least one PRS configuration has changed compared to the reference posSIB, e.g., as discussed in FIG. 6 and at stage 7 of FIG. 9.

In one implementation, the second block of the posSIB contains location information for any transmission reception points (TRPs) for which the location information of the same TRP included in the reference posSIB is different, e.g., as discussed in FIG. 6 and at stage 7 of FIG. 9.

In one implementation, the reference encoding in the first block of the posSIB further contains a validity time for each of the one or more blocks of the posSIB, e.g., as discussed in FIG. 6 and stage 3 of FIG. 9.

Figure 15:
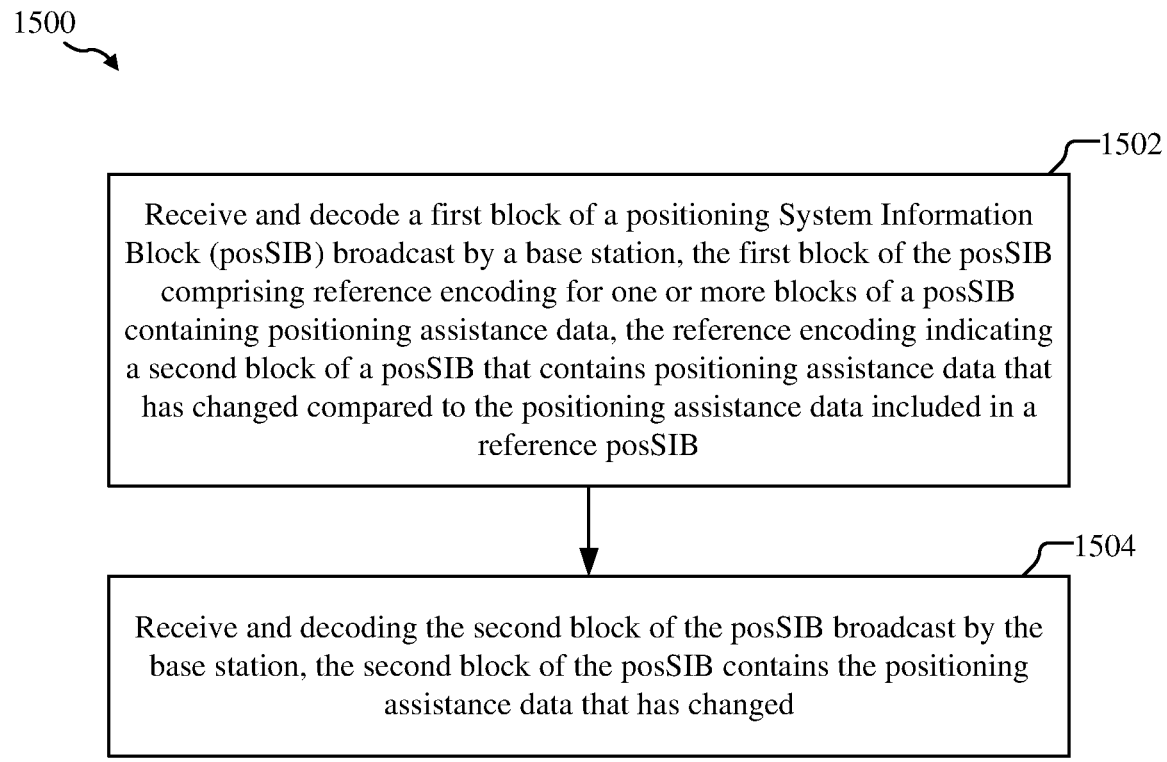
FIG. 15 shows a flowchart for an exemplary method for supporting broadcast of positioning assistance data in a wireless network performed by a UE.

FIG. 15 shows a flowchart for an exemplary method 1500 for supporting broadcast of positioning assistance data in a wireless network performed by a UE in a wireless network, such as UE 104, in a manner consistent with disclosed implementation.

At block 1502, the UE receives and decodes a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB, e.g., as discussed in FIGS. 6, 7, 8, and stage 5 of FIG. 9. In one implementation, the reference encoding may further indicate schedule information for the second block of the posSIB. A means for receiving and decoding a first block of a positioning System Information Block (posSIB) broadcast by a base station may include, e.g., the wireless transceiver 1210 and one or more processors 1202 with dedicated hardware or implementing executable code or software instructions in memory 1204 and/or medium 1220, such as the receive posSIB (reference encoding) module 1222), in UE 1200 shown in FIG. 12.

At block 1504, the UE receives and decodes the second block of the posSIB broadcast by the base station, the second block of the posSIB contains the positioning assistance data that has changed, e.g., as discussed in FIGS. 6, 7, 8, and stage 7 of FIG. 9. A means for receiving and decoding the second block of the posSIB broadcast by the base station, the second block of the posSIB contains the positioning assistance data that has changed, e.g., the wireless transceiver 1210 and one or more processors 1202 with dedicated hardware or implementing executable code or software instructions in memory 1204 and/or medium 1220, such as the receive posSIB (differential PAD) module 1224, in UE 1200 shown in FIG. 12.

In some implementations, the UE may receive a third block of the posSIB that contains at least the positioning assistance data that has not changed compared to the positioning assistance data included in the reference posSIB, e.g., as discussed in FIGS. 6, 7, 8, and stages 6 and 8 of FIG. 9. A means for receiving a third block of the posSIB that contains at least the positioning assistance data that has not changed compared to the positioning assistance data included in the reference posSIB may include, e.g., the wireless transceiver 1210 and one or more processors 1202 with dedicated hardware or implementing executable code or software instructions in memory 1204 and/or medium 1220, such as the receive posSIB (unchanged PAD) module 1226, in UE 1200 shown in FIG. 12.

In one implementation, the third block of the posSIB that contains at least the positioning assistance data that has not changed is not decoded, e.g., as discussed in FIGS. 6, 7, and 8 and stages 6 and 8 of FIG. 9. The third block of the posSIB may be broadcast separately from the first block of the posSIB and the second block of the posSIB, e.g., as discussed in FIGS. 6, and 7 and stage 6 of FIG. 9. The UE may further receive a fourth block of the posSIB broadcast by the base station, the fourth block of the posSIB contains the positioning assistance data that has not changed and the positioning assistance data that has changed, e.g., as discussed in FIG. 6 and stages 5, 6, 7, and 8 of FIG. 9. A means for receiving a fourth block of the posSIB broadcast by the base station, the fourth block of the posSIB contains the positioning assistance data that has not changed and the positioning assistance data that has changed may include, e.g., the wireless transceiver 1210 and one or more processors 1202 with dedicated hardware or implementing executable code or software instructions in memory 1204 and/or medium 1220 in UE 1200 shown in FIG. 12. The first block of the posSIB, the second block of the posSIB, the third block of the posSIB, and the fourth block of the posSIB may be broadcast periodically, wherein the fourth block of the posSIB is broadcast less frequently than the first block of the posSIB, the second block of the posSIB and the third block of the posSIB, e.g., as discussed in FIG. 6.

In one implementation, the third block of the posSIB may further contain the positioning assistance data that has changed compared to the positioning assistance data included in the reference posSIB, e.g., as discussed in FIGS. 6 and 8 and stage 6 of FIG. 9. For example, the first block of the posSIB, the second block of the posSIB and the third block of the posSIB are broadcast periodically, wherein the third block of the posSIB is broadcast less frequently than the first block of the posSIB and the second block of the posSIB, e.g., as discussed in FIG. 6.

In one implementation, the second block of the posSIB may be broadcast separately from the first block of the posSIB e.g., as discussed in FIGS. 6, 7, 8, and stages 5 and 7 of FIG. 9. For example, the first block of the posSIB and the second block of the posSIB may be broadcast separately with an offset of less than 8 radio frames, e.g., as discussed in FIG. 6.

In one implementation, the positioning assistance data is for one of downlink positioning reference signal (PRS) assistance data or transmission reception point (TRP) location data or Real Time Difference (RTD) data, e.g., as discussed in FIG. 6.

In one implementation, the second block of the posSIB contains complete PRS configuration information for any transmission reception points (TRPs) for which at least one PRS configuration has changed compared to the reference posSIB, e.g., as discussed in FIG. 6 and at stage 7 of FIG. 9.

In one implementation, the second block of the posSIB contains PRS configuration information for any transmission reception points (TRPs) for which corresponding PRS configuration has changed compared to the reference posSIB, e.g., as discussed in FIG. 6 and at stage 7 of FIG. 9.

In one implementation, the second block of the posSIB contains complete PRS configuration information for any frequency layer for which at least one PRS configuration has changed compared to the reference posSIB, e.g., as discussed in FIG. 6 and at stage 7 of FIG. 9.

In one implementation, the second block of the posSIB contains location information for any transmission reception points (TRPs) for which the location information of the same TRP included in the reference posSIB is different, e.g., as discussed in FIG. 6 and at stage 7 of FIG. 9.

In one implementation, the reference encoding in the first block of the posSIB further contains a validity time for each of the one or more blocks of the posSIB, e.g., as discussed in FIG. 6 and stage 3 of FIG. 9.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method performed by a base station for supporting broadcast of positioning assistance data in a wireless network, the method comprising: broadcasting a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and broadcasting the second block of the posSIB that contains the positioning assistance data that has changed.

Clause 2. The method of clause 1, wherein the reference encoding further indicates schedule information for the second block of the posSIB.

Clause 3. The method of either of clauses 1 or 2, further comprising broadcasting a third block of a posSIB that contains at least the positioning assistance data that has not changed compared to the positioning assistance data included in the reference posSIB.

Clause 4. The method of clause 3, wherein the third block of the posSIB is broadcast separately from the first block of the posSIB and the second block of the posSIB.

Clause 5. The method of clause 4, further comprising broadcasting a fourth block of a posSIB that contains the positioning assistance data that has not changed and the positioning assistance data that has changed.

Clause 6. The method of clause 5, wherein the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB.

Clause 7. The method of any of clauses 3-6, wherein the third block of the posSIB further contains the positioning assistance data that has changed compared to the positioning assistance data included in the reference posSIB.

Clause 8. The method of clause 7, wherein the first block of the posSIB, the second block of the posSIB and the third block of the posSIB are broadcast periodically, wherein the third block of the posSIB is broadcast less frequently than the first block of the posSIB and the second block of the posSIB.

Clause 9. The method of any of clauses 1-8, wherein the second block of the posSIB is broadcast separately from the first block of the posSIB.

Clause 10. The method of clause 9, wherein the first block of the posSIB and the second block of the posSIB are broadcast separately with an offset of less than 8 radio frames.

Clause 11. The method of any of clauses 1-10, wherein the positioning assistance data is for one of downlink positioning reference signal (PRS) assistance data or transmission reception point (TRP) location data or Real Time Difference (RTD) data.

Clause 12. The method of any of clauses 1-11, wherein the second block of the posSIB contains complete PRS configuration information for any transmission reception points (TRPs) for which at least one PRS configuration has changed compared to the reference posSIB.

Clause 13. The method of any of clauses 1-12, wherein the second block of the posSIB contains PRS configuration information for any transmission reception points (TRPs) for which corresponding PRS configuration has changed compared to the reference posSIB.

Clause 14. The method of any of clauses 1-13, wherein the second block of the posSIB contains complete PRS configuration information for any frequency layer for which at least one PRS configuration has changed compared to the reference posSIB.

Clause 15. The method of any of clauses 1-14, wherein the second block of the posSIB contains location information for any transmission reception points (TRPs) for which the location information of the same TRP included in the reference posSIB is different.

Clause 16. The method of any of clauses 1-15, wherein the reference encoding in the first block of the posSIB further contains a validity time for each of the one or more blocks of the posSIB.

Clause 17. A base station configured to support broadcast of positioning assistance data in a wireless network, comprising: an external interface configured to wirelessly communicate with a UE in the wireless network; at least one memory; at least one processor coupled to the external interface and the at least one memory, wherein the at least one processor is configured to: broadcast, via the external interface, a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and broadcast, via the external interface, the second block of the posSIB that contains the positioning assistance data that has changed.

Clause 18. The base station of clause 17, wherein the reference encoding further indicates schedule information for the second block of the posSIB.

Clause 19. The base station of either of clauses 17 or 18, wherein the at least one processor is further configured to broadcast, via the external interface, a third block of a posSIB that contains at least the positioning assistance data that has not changed compared to the positioning assistance data included in the reference posSIB.

Clause 20. The base station of clause 19, wherein the third block of the posSIB is broadcast separately from the first block of the posSIB and the second block of the posSIB.

Clause 21. The base station of clause 20, wherein the at least one processor is further configured to broadcast a fourth block of a posSIB that contains the positioning assistance data that has not changed and the positioning assistance data that has changed.

Clause 22. The base station of clause 21, wherein the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB.

Clause 23. The base station of any of clauses 19-22, wherein the third block of the posSIB further contains the positioning assistance data that has changed compared to the positioning assistance data included in the reference posSIB.

Clause 24. The base station of clause 23, wherein the first block of the posSIB, the second block of the posSIB and the third block of the posSIB are broadcast periodically, wherein the third block of the posSIB is broadcast less frequently than the first block of the posSIB and the second block of the posSIB.

Clause 25. The base station of any of clauses 17-24, wherein the second block of the posSIB is broadcast separately from the first block of the posSIB.

Clause 26. The base station of clause 25, wherein the first block of the posSIB and the second block of the posSIB are broadcast separately with an offset of less than 8 radio frames.

Clause 27. The base station of any of clauses 17-26, wherein the positioning assistance data is for one of downlink positioning reference signal (PRS) assistance data or transmission reception point (TRP) location data or Real Time Difference (RTD) data.

Clause 28. The base station of any of clauses 17-27, wherein the second block of the posSIB contains complete PRS configuration information for any transmission reception points (TRPs) for which at least one PRS configuration has changed compared to the reference posSIB.

Clause 29. The base station of any of clauses 17-28, wherein the second block of the posSIB contains PRS configuration information for any transmission reception points (TRPs) for which corresponding PRS configuration has changed compared to the reference posSIB.

Clause 30. The base station of any of clauses 17-29, wherein the second block of the posSIB contains complete PRS configuration information for any frequency layer for which at least one PRS configuration has changed compared to the reference posSIB.

Clause 31. The base station of any of clauses 17-30, wherein the second block of the posSIB contains location information for any transmission reception points (TRPs) for which the location information of the same TRP included in the reference posSIB is different.

Clause 32. The base station of any of clauses 17-31, wherein the reference encoding in the first block of the posSIB further contains a validity time for each of the one or more blocks of the posSIB.

Clause 33. A base station configured to support broadcast of positioning assistance data in a wireless network, comprising: means for broadcasting a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and means for broadcasting the second block of the posSIB that contains the positioning assistance data that has changed.

Clause 34. The base station of clause 33, wherein the reference encoding further indicates schedule information for the second block of the posSIB.

Clause 35. The base station of either of clauses 33 or 34, further comprising means for broadcasting a third block of a posSIB that contains at least the positioning assistance data that has not changed compared to the positioning assistance data included in the reference posSIB.

Clause 36. The base station of clause 35, wherein the third block of the posSIB is broadcast separately from the first block of the posSIB and the second block of the posSIB.

Clause 37. The base station of clause 36, further comprising broadcasting a fourth block of a posSIB that contains the positioning assistance data that has not changed and the positioning assistance data that has changed.

Clause 38. The base station of clause 37, wherein the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB.

Clause 39. The base station of any of clauses 35-38, wherein the third block of the posSIB further contains the positioning assistance data that has changed compared to the positioning assistance data included in the reference posSIB.

Clause 40. The base station of clause 39, wherein the first block of the posSIB, the second block of the posSIB and the third block of the posSIB are broadcast periodically, wherein the third block of the posSIB is broadcast less frequently than the first block of the posSIB and the second block of the posSIB.

Clause 41. The base station of any of clauses 33-40, wherein the second block of the posSIB is broadcast separately from the first block of the posSIB.

Clause 42. The base station of clause 41, wherein the first block of the posSIB and the second block of the posSIB are broadcast separately with an offset of less than 8 radio frames.

Clause 43. The base station of any of clauses 33-42, wherein the positioning assistance data is for one of downlink positioning reference signal (PRS) assistance data or transmission reception point (TRP) location data or Real Time Difference (RTD) data.

Clause 44. The base station of any of clauses 33-43, wherein the second block of the posSIB contains complete PRS configuration information for any transmission reception points (TRPs) for which at least one PRS configuration has changed compared to the reference posSIB.

Clause 45. The base station of any of clauses 33-44, wherein the second block of the posSIB contains PRS configuration information for any transmission reception points (TRPs) for which corresponding PRS configuration has changed compared to the reference posSIB.

Clause 46. The base station of any of clauses 33-45, wherein the second block of the posSIB contains complete PRS configuration information for any frequency layer for which at least one PRS configuration has changed compared to the reference posSIB.

Clause 47. The base station of any of clauses 33-46, wherein the second block of the posSIB contains location information for any transmission reception points (TRPs) for which the location information of the same TRP included in the reference posSIB is different.

Clause 48. The base station of any of clauses 33-47, wherein the reference encoding in the first block of the posSIB further contains a validity time for each of the one or more blocks of the posSIB.

Clause 49. A non-transitory computer readable storage medium including program code stored thereon, the program code is operable to configure at least one processor in a base station for supporting broadcast of positioning assistance data in a wireless network performed, the program code comprising instructions to: broadcast a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB; and broadcast the second block of the posSIB that contains the positioning assistance data that has changed.

Clause 50. A method performed by a location server for supporting broadcast of positioning assistance data in a wireless network, the method comprising: determining the positioning assistance data to be broadcast by a base station including the positioning assistance data that has changed and the positioning assistance data that has not changed; producing a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and sending the plurality of blocks the posSIBs to the base station.

Clause 51. The method of clause 50, wherein the reference encoding further indicates schedule information for the second block of the posSIB.

Clause 52. The method of either of clauses 50 or 51, wherein the plurality of blocks of posSIBs further comprises a third block of a posSIB that contains at least the positioning assistance data that has not changed compared to the positioning assistance data included in the reference posSIB.

Clause 53. The method of clause 52, wherein the base station broadcasts the third block of the posSIB separately from the first block of the posSIB and the second block of the posSIB.

Clause 54. The method of clause 53, wherein the plurality of blocks of the posSIBs further comprises a fourth block of a posSIB that contains the positioning assistance data that has not changed and the positioning assistance data that has changed.

Clause 55. The method of clause 54, wherein the base station broadcasts the first block of the posSIB, the second block of the posSIB, the third block of the posSIB, and the fourth block of the posSIB periodically, wherein the fourth block of the posSIB is broadcast less frequently than the first block of the posSIB, the second block of the posSIB and the third block of the posSIB.

Clause 56. The method of any of clauses 52-55, wherein the third block of the posSIB further contains the positioning assistance data that has changed compared to the positioning assistance data included in the reference posSIB.

Clause 57. The method of clause 56, wherein the base station broadcasts the first block of the posSIB, the second block of the posSIB and the third block of the posSIB periodically, wherein the third block of the posSIB is broadcast less frequently than the first block of the posSIB and the second block of the posSIB.

Clause 58. The method of any of clauses 50-57, wherein the base station broadcasts the second block of the posSIB separately from the first block of the posSIB.

Clause 59. The method of clause 58, wherein the base station broadcasts the first block of the posSIB and the second block of the posSIB are broadcast separately with an offset of less than 8 radio frames.

Clause 60. The method of any of clauses 50-59, wherein the positioning assistance data is for one of downlink positioning reference signal (PRS) assistance data or transmission reception point (TRP) location data or Real Time Difference (RTD) data.

Clause 61. The method of any of clauses 50-60, wherein the second block of the posSIB contains complete PRS configuration information for any transmission reception points (TRPs) for which at least one PRS configuration has changed compared to the reference posSIB.

Clause 62. The method of any of clauses 50-61, wherein the second block of the posSIB contains PRS configuration information for any transmission reception points (TRPs) for which corresponding PRS configuration has changed compared to the reference posSIB.

Clause 63. The method of any of clauses 50-62, wherein the second block of the posSIB contains complete PRS configuration information for any frequency layer for which at least one PRS configuration has changed compared to the reference posSIB.

Clause 64. The method of any of clauses 50-63, wherein the second block of the posSIB contains location information for any transmission reception points (TRPs) for which the location information of the same TRP included in the reference posSIB is different.

Clause 65. The method of any of clauses 50-64, wherein the reference encoding in the first block of the posSIB further contains a validity time for each of the one or more blocks of the posSIB.

Clause 66. A location server configured to support broadcast of positioning assistance data in a wireless network, comprising: an external interface configured to wirelessly communicate with a base station in the wireless network; at least one memory; at least one processor coupled to the external interface and the at least one memory, wherein the at least one processor is configured to: determine the positioning assistance data to be broadcast by the base station including the positioning assistance data that has changed and the positioning assistance data that has not changed; produce a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and send, via the external interface, the plurality of blocks the posSIBs to the base station.

Clause 67. The location server of clause 66, wherein the reference encoding further indicates schedule information for the second block of the posSIB.

Clause 68. The location server of either of clauses 66 or 67, wherein the plurality of blocks of posSIBs further comprises a third block of a posSIB that contains at least the positioning assistance data that has not changed compared to the positioning assistance data included in the reference posSIB.

Clause 69. The location server of clause 68, wherein the base station broadcasts the third block of the posSIB separately from the first block of the posSIB and the second block of the posSIB.

Clause 70. The location server of clause 69, wherein the plurality of blocks of the posSIBs further comprises a fourth block of a posSIB that contains the positioning assistance data that has not changed and the positioning assistance data that has changed.

Clause 71. The location server of clause 70, wherein the base station broadcasts the first block of the posSIB, the second block of the posSIB, the third block of the posSIB, and the fourth block of the posSIB periodically, wherein the fourth block of the posSIB is broadcast less frequently than the first block of the posSIB, the second block of the posSIB and the third block of the posSIB.

Clause 72. The location server of any of clauses 68-71, wherein the third block of the posSIB further contains the positioning assistance data that has changed compared to the positioning assistance data included in the reference posSIB.

Clause 73. The location server of clause 72, wherein the base station broadcasts the first block of the posSIB, the second block of the posSIB and the third block of the posSIB periodically, wherein the third block of the posSIB is broadcast less frequently than the first block of the posSIB and the second block of the posSIB.

Clause 74. The location server of any of clauses 66-73, wherein the base station broadcasts the second block of the posSIB separately from the first block of the posSIB.

Clause 75. The location server of clause 74, wherein the base station broadcasts the first block of the posSIB and the second block of the posSIB are broadcast separately with an offset of less than 8 radio frames.

Clause 76. The location server of any of clauses 66-75, wherein the positioning assistance data is for one of downlink positioning reference signal (PRS) assistance data or transmission reception point (TRP) location data or Real Time Difference (RTD) data.

Clause 77. The location server of any of clauses 66-76, wherein the second block of the posSIB contains complete PRS configuration information for any transmission reception points (TRPs) for which at least one PRS configuration has changed compared to the reference posSIB.

Clause 78. The location server of any of clauses 66-77, wherein the second block of the posSIB contains PRS configuration information for any transmission reception points (TRPs) for which corresponding PRS configuration has changed compared to the reference posSIB.

Clause 79. The location server of any of clauses 66-78, wherein the second block of the posSIB contains complete PRS configuration information for any frequency layer for which at least one PRS configuration has changed compared to the reference posSIB.

Clause 80. The location server of any of clauses 66-79, wherein the second block of the posSIB contains location information for any transmission reception points (TRPs) for which the location information of the same TRP included in the reference posSIB is different.

Clause 81. The location server of any of clauses 66-80, wherein the reference encoding in the first block of the posSIB further contains a validity time for each of the one or more blocks of the posSIB.

Clause 82. A location server configured to support broadcast of positioning assistance data in a wireless network, comprising: means for determining the positioning assistance data to be broadcast by a base station including the positioning assistance data that has changed and the positioning assistance data that has not changed; means for producing a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and means for sending the plurality of blocks the posSIBs to the base station.

Clause 83. The location server of clause 82, wherein the reference encoding further indicates schedule information for the second block of the posSIB.

Clause 84. The location server of either of clauses 82 or 83, wherein the plurality of blocks of posSIBs further comprises a third block of a posSIB that contains at least the positioning assistance data that has not changed compared to the positioning assistance data included in the reference posSIB.

Clause 85. The location server of clause 84, wherein the base station broadcasts the third block of the posSIB separately from the first block of the posSIB and the second block of the posSIB.

Clause 86. The location server of clause 85, wherein the plurality of blocks of the posSIBs further comprises a fourth block of a posSIB that contains the positioning assistance data that has not changed and the positioning assistance data that has changed.

Clause 87. The location server of clause 86, wherein the base station broadcasts the first block of the posSIB, the second block of the posSIB, the third block of the posSIB, and the fourth block of the posSIB periodically, wherein the fourth block of the posSIB is broadcast less frequently than the first block of the posSIB, the second block of the posSIB and the third block of the posSIB.

Clause 88. The location server of any of clauses 84-87, wherein the third block of the posSIB further contains the positioning assistance data that has changed compared to the positioning assistance data included in the reference posSIB.

Clause 89. The location server of clause 88, wherein the base station broadcasts the first block of the posSIB, the second block of the posSIB and the third block of the posSIB periodically, wherein the third block of the posSIB is broadcast less frequently than the first block of the posSIB and the second block of the posSIB.

Clause 90. The location server of any of clauses 82-89, wherein the base station broadcasts the second block of the posSIB separately from the first block of the posSIB.

Clause 91. The location server of clause 90, wherein the base station broadcasts the first block of the posSIB and the second block of the posSIB are broadcast separately with an offset of less than 8 radio frames.

Clause 92. The location server of any of clauses 82-91, wherein the positioning assistance data is for one of downlink positioning reference signal (PRS) assistance data or transmission reception point (TRP) location data or Real Time Difference (RTD) data.

Clause 93. The location server of any of clauses 82-92, wherein the second block of the posSIB contains complete PRS configuration information for any transmission reception points (TRPs) for which at least one PRS configuration has changed compared to the reference posSIB.

Clause 94. The location server of any of clauses 82-93, wherein the second block of the posSIB contains PRS configuration information for any transmission reception points (TRPs) for which corresponding PRS configuration has changed compared to the reference posSIB.

Clause 95. The location server of any of clauses 82-94, wherein the second block of the posSIB contains complete PRS configuration information for any frequency layer for which at least one PRS configuration has changed compared to the reference posSIB.

Clause 96. The location server of any of clauses 82-95, wherein the second block of the posSIB contains location information for any transmission reception points (TRPs) for which the location information of the same TRP included in the reference posSIB is different.

Clause 97. The location server of any of clauses 82-96, wherein the reference encoding in the first block of the posSIB further contains a validity time for each of the one or more blocks of the posSIB.

Clause 98. A non-transitory computer readable storage medium including program code stored thereon, the program code is operable to configure at least one processor in a location server to support broadcast of positioning assistance data in a wireless network, the program code comprising instructions to: determine the positioning assistance data to be broadcast by a base station including the positioning assistance data that has changed and the positioning assistance data that has not changed; produce a plurality of blocks of positioning System Information Blocks (posSIB) comprising: a first block of a posSIB that contains reference encoding for one or more blocks of a posSIB containing the positioning assistance data, the reference encoding indicating a second block of a posSIB that contains positioning assistance data that has changed; the second block of the posSIB that contains the positioning assistance data that has changed compared to the positioning assistance data included in a reference posSIB; and send the plurality of blocks the posSIBs to the base station.

Clause 99. A method performed by a user equipment (UE) for supporting broadcast of positioning assistance data in a wireless network, the method comprising: receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and receiving and decoding the second block of the posSIB broadcast by the base station, the second block of the posSIB contains the positioning assistance data that has changed.

Clause 100. The method of clause 99, wherein the reference encoding further indicates schedule information for the second block of the posSIB.

Clause 101. The method of either of clauses 99 or 100, further comprising receiving a third block of the posSIB that contains at least the positioning assistance data that has not changed compared to the positioning assistance data included in the reference posSIB.

Clause 102. The method of clause 101, wherein the third block of the posSIB that contains at least the positioning assistance data that has not changed is not decoded.

Clause 103. The method of clause 101, wherein the third block of the posSIB is broadcast separately from the first block of the posSIB and the second block of the posSIB.

Clause 104. The method of clause 103, further comprising receiving a fourth block of the posSIB broadcast by the base station, the fourth block of the posSIB contains the positioning assistance data that has not changed and the positioning assistance data that has changed.

Clause 105. The method of clause 104, wherein the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB.

Clause 106. The method of any of clauses 101-105, wherein the third block of the posSIB further contains the positioning assistance data that has changed compared to the positioning assistance data included in the reference posSIB.

Clause 107. The method of clause 106, wherein the first block of the posSIB, the second block of the posSIB and the third block of the posSIB are broadcast periodically, wherein the third block of the posSIB is broadcast less frequently than the first block of the posSIB and the second block of the posSIB.

Clause 108. The method of any of clauses 99-107, wherein the second block of the posSIB is broadcast separately from the first block of the posSIB.

Clause 109. The method of clause 108, wherein the first block of the posSIB and the second block of the posSIB are broadcast separately with an offset of less than 8 radio frames.

Clause 110. The method of any of clauses 99-109, wherein the positioning assistance data is for one of downlink positioning reference signal (PRS) assistance data or transmission reception point (TRP) location data or Real Time Difference (RTD) data.

Clause 111. The method of any of clauses 99-110, wherein the second block of the posSIB contains complete PRS configuration information for any transmission reception points (TRPs) for which at least one PRS configuration has changed compared to the reference posSIB.

Clause 112. The method of any of clauses 99-111, wherein the second block of the posSIB contains PRS configuration information for any transmission reception points (TRPs) for which corresponding PRS configuration has changed compared to the reference posSIB.

Clause 113. The method of any of clauses 99-112, wherein the second block of the posSIB contains complete PRS configuration information for any frequency layer for which at least one PRS configuration has changed compared to the reference posSIB.

Clause 114. The method of any of clauses 99-113, wherein the second block of the posSIB contains location information for any transmission reception points (TRPs) for which the location information of the same TRP included in the reference posSIB is different.

Clause 115. The method of any of clauses 99-114, wherein the reference encoding in the first block of the posSIB further contains a validity time for each of the one or more blocks of the posSIB.

Clause 116. A user equipment (UE) configured to support broadcast of positioning assistance data in a wireless network, comprising: a wireless transceiver configured to wirelessly communicate with a base station in the wireless network; at least one memory; at least one processor coupled to the wireless transceiver and the at least one memory, wherein the at least one processor is configured to: receiving, via the wireless transceiver, and decoding a first block of a positioning System Information Block (posSIB) broadcast by the base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and receiving, via the wireless transceiver, and decoding the second block of the posSIB broadcast by the base station, the second block of the posSIB contains the positioning assistance data that has changed.

Clause 117. The UE of clause 116, wherein the reference encoding further indicates schedule information for the second block of the posSIB.

Clause 118. The UE of either of clauses 116 or 117, wherein the at least one processor is further configured to receive, via the wireless transceiver, a third block of the posSIB that contains at least the positioning assistance data that has not changed compared to the positioning assistance data included in the reference posSIB.

Clause 119. The UE of clause 118, wherein the third block of the posSIB that contains at least the positioning assistance data that has not changed is not decoded.

Clause 120. The UE of clause 118, wherein the third block of the posSIB is broadcast separately from the first block of the posSIB and the second block of the posSIB.

Clause 121. The UE of clause 120, wherein the at least one processor is further configured to receive, via the wireless transceiver, a fourth block of the posSIB broadcast by the base station, the fourth block of the posSIB contains the positioning assistance data that has not changed and the positioning assistance data that has changed.

Clause 122. The UE of clause 121, wherein the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB.

Clause 123. The UE of any of clauses 118-122, wherein the third block of the posSIB further contains the positioning assistance data that has changed compared to the positioning assistance data included in the reference posSIB.

Clause 124. The UE of clause 123, wherein the first block of the posSIB, the second block of the posSIB and the third block of the posSIB are broadcast periodically, wherein the third block of the posSIB is broadcast less frequently than the first block of the posSIB and the second block of the posSIB.

Clause 125. The UE of any of clauses 116-124, wherein the second block of the posSIB is broadcast separately from the first block of the posSIB.

Clause 126. The UE of clause 125, wherein the first block of the posSIB and the second block of the posSIB are broadcast separately with an offset of less than 8 radio frames.

Clause 127. The UE of any of clauses 116-126, wherein the positioning assistance data is for one of downlink positioning reference signal (PRS) assistance data or transmission reception point (TRP) location data or Real Time Difference (RTD) data.

Clause 128. The UE of any of clauses 116-127, wherein the second block of the posSIB contains complete PRS configuration information for any transmission reception points (TRPs) for which at least one PRS configuration has changed compared to the reference posSIB.

Clause 129. The UE of any of clauses 116-128, wherein the second block of the posSIB contains PRS configuration information for any transmission reception points (TRPs) for which corresponding PRS configuration has changed compared to the reference posSIB.

Clause 130. The UE of any of clauses 116-129, wherein the second block of the posSIB contains complete PRS configuration information for any frequency layer for which at least one PRS configuration has changed compared to the reference posSIB.

Clause 131. The UE of any of clauses 116-130, wherein the second block of the posSIB contains location information for any transmission reception points (TRPs) for which the location information of the same TRP included in the reference posSIB is different.

Clause 132. The UE of any of clauses 116-131, wherein the reference encoding in the first block of the posSIB further contains a validity time for each of the one or more blocks of the posSIB.

Clause 133. A user equipment (UE) configured to support broadcast of positioning assistance data in a wireless network, comprising: means for receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and means for receiving and decoding the second block of the posSIB broadcast by the base station, the second block of the posSIB contains the positioning assistance data that has changed.

Clause 134. The UE of clause 133, wherein the reference encoding further indicates schedule information for the second block of the posSIB.

Clause 135. The UE of either of clauses 133 or 134, further comprising means for receiving a third block of the posSIB that contains at least the positioning assistance data that has not changed compared to the positioning assistance data included in the reference posSIB.

Clause 136. The UE of clause 135, wherein the third block of the posSIB that contains at least the positioning assistance data that has not changed is not decoded.

Clause 137. The UE of clause 135, wherein the third block of the posSIB is broadcast separately from the first block of the posSIB and the second block of the posSIB.

Clause 138. The UE of clause 137, further comprising means for receiving a fourth block of the posSIB broadcast by the base station, the fourth block of the posSIB contains the positioning assistance data that has not changed and the positioning assistance data that has changed.

Clause 139. The UE of clause 138, wherein the first block of the posSIB, the second block of the posSIB, the third block of the posSIB, and the fourth block of the posSIB are broadcast periodically, wherein the fourth block of the posSIB is broadcast less frequently than the first block of the posSIB, the second block of the posSIB and the third block of the posSIB.

Clause 140. The UE of any of clauses 135-139, wherein the third block of the posSIB further contains the positioning assistance data that has changed compared to the positioning assistance data included in the reference posSIB.

Clause 141. The UE of clause 140, wherein the first block of the posSIB, the second block of the posSIB and the third block of the posSIB are broadcast periodically, wherein the third block of the posSIB is broadcast less frequently than the first block of the posSIB and the second block of the posSIB.

Clause 142. The UE of any of clauses 133-141, wherein the second block of the posSIB is broadcast separately from the first block of the posSIB.

Clause 143. The UE of clause 142, wherein the first block of the posSIB and the second block of the posSIB are broadcast separately with an offset of less than 8 radio frames.

Clause 144. The UE of any of clauses 133-143, wherein the positioning assistance data is for one of downlink positioning reference signal (PRS) assistance data or transmission reception point (TRP) location data or Real Time Difference (RTD) data.

Clause 145. The UE of any of clauses 133-144, wherein the second block of the posSIB contains complete PRS configuration information for any transmission reception points (TRPs) for which at least one PRS configuration has changed compared to the reference posSIB.

Clause 146. The UE of any of clauses 133-145, wherein the second block of the posSIB contains PRS configuration information for any transmission reception points (TRPs) for which corresponding PRS configuration has changed compared to the reference posSIB.

Clause 147. The UE of any of clauses 133-146, wherein the second block of the posSIB contains complete PRS configuration information for any frequency layer for which at least one PRS configuration has changed compared to the reference posSIB.

Clause 148. The UE of any of clauses 133-147, wherein the second block of the posSIB contains location information for any transmission reception points (TRPs) for which the location information of the same TRP included in the reference posSIB is different.

Clause 149. The UE of any of clauses 133-148, wherein the reference encoding in the first block of the posSIB further contains a validity time for each of the one or more blocks of the posSIB.

Clause 150. A non-transitory computer readable storage medium including program code stored thereon, the program code is operable to configure at least one processor in a user equipment (UE) to support broadcast of positioning assistance data in a wireless network, the program code comprising instructions to: receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and receiving and decoding the second block of the posSIB broadcast by the base station, the second block of the posSIB contains the positioning assistance data that has changed.

Therefore, it is intended that claimed subject matter not be limited to the particular examples disclosed, but that such claimed subject matter may also include all aspects falling within the scope of appended claims, and equivalents thereof.

What is claimed is:

1. A method performed by a base station for supporting broadcast of positioning assistance data in a wireless network, the method comprising:
broadcasting a first block of a positioning System Information Block (posSIB), the first block comprising reference encoding for one or more blocks of a posSIB containing positioning assistance data, the reference encoding indicating a second block of a posSIB that contains positioning assistance data that has changed compared to the positioning assistance data included in a reference posSIB; and
broadcasting the second block of the posSIB that contains the positioning assistance data that has changed, wherein the second block of the posSIB contains PRS configuration information for any transmission reception points (TRPs) for which corresponding PRS configuration has changed compared to the reference posSIB.

2. The method of claim 1, wherein the reference encoding further indicates schedule information for the second block of the posSIB.

3. A method performed by a base station for supporting broadcast of positioning assistance data in a wireless network, the method comprising:
broadcasting a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB;
broadcasting the second block of the posSIB that contains the positioning assistance data that has changed; and
broadcasting a third block of a posSIB that contains at least the positioning assistance data that has not changed compared to the positioning assistance data included in the reference posSIB.

4. The method of claim 3, wherein the third block of the posSIB is broadcast separately from the first block of the posSIB and the second block of the posSIB.

5. The method of claim 3, wherein the third block of the posSIB further contains the positioning assistance data that has changed compared to the positioning assistance data included in the reference posSIB.

6. The method of claim 1, wherein the second block of the posSIB is broadcast separately from the first block of the posSIB.

7. The method of claim 6, wherein the first block of the posSIB and the second block of the posSIB are broadcast separately with an offset of less than 8 radio frames.

8. The method of claim 1, wherein the positioning assistance data is for one of downlink positioning reference signal (PRS) assistance data or transmission reception point (TRP) location data or Real Time Difference (RTD) data.

9. The method of claim 1, wherein the second block of the posSIB contains complete PRS configuration information for any transmission reception points (TRPs) for which at least one PRS configuration has changed compared to the reference posSIB.

10. The method of claim 1, wherein the second block of the posSIB contains complete PRS configuration information for any frequency layer for which at least one PRS configuration has changed compared to the reference posSIB.

11. The method of claim 1, wherein the second block of the posSIB contains location information for any transmission reception points (TRPs) for which the location information of the same TRP included in the reference posSIB is different.

12. The method of claim 1, wherein the reference encoding in the first block of the posSIB further contains a validity time for each of the one or more blocks of the posSIB.

13. A base station configured to support broadcast of positioning assistance data in a wireless network, comprising:
an external interface configured to wirelessly communicate with a user equipment (UE) in the wireless network;
at least one memory;
at least one processor coupled to the external interface and the at least one memory, wherein the at least one processor is configured to:
broadcast, via the external interface, a first block of a positioning System Information Block (posSIB), the first block comprising reference encoding for one or more blocks of a posSIB containing positioning assistance data, the reference encoding indicating a second block of a posSIB that contains positioning assistance data that has changed compared to the positioning assistance data included in a reference posSIB; and
broadcast, via the external interface, the second block of the posSIB that contains the positioning assistance data that has changed, wherein the second block of the posSIB contains PRS configuration information for any transmission reception points (TRPs) for which corresponding PRS configuration has changed compared to the reference posSIB.

14. The base station of claim 13, wherein the reference encoding further indicates schedule information for the second block of the posSIB.

15. A base station configured to support broadcast of positioning assistance data in a wireless network, comprising:
an external interface configured to wirelessly communicate with a user equipment (UE) in the wireless network;
at least one memory;
at least one processor coupled to the external interface and the at least one memory, wherein the at least one processor is configured to:
broadcast, via the external interface, a first block of a positioning System Information Block (posSIB) comprising reference encoding for one or more blocks of a posSIB containing positioning assistance data, the reference encoding indicating a second block of a posSIB that contains positioning assistance data that has changed compared to the positioning assistance data included in a reference posSIB;
broadcast, via the external interface, the second block of the posSIB that contains the positioning assistance data that has changed; and
broadcast, via the external interface, a third block of a posSIB that contains at least the positioning assistance data that has not changed compared to the positioning assistance data included in the reference posSIB.

16. The base station of claim 15, wherein the third block of the posSIB is broadcast separately from the first block of the posSIB and the second block of the posSIB.

17. The base station of claim 15, wherein the third block of the posSIB further contains the positioning assistance data that has changed compared to the positioning assistance data included in the reference posSIB.

18. The base station of claim 13, wherein the second block of the posSIB is broadcast separately from the first block of the posSIB.

19. The base station of claim 18, wherein the first block of the posSIB and the second block of the posSIB are broadcast separately with an offset of less than 8 radio frames.

20. The base station of claim 13, wherein the positioning assistance data is for one of downlink positioning reference signal (PRS) assistance data or transmission reception point (TRP) location data or Real Time Difference (RTD) data.

21. The base station of claim 13, wherein the second block of the posSIB contains complete PRS configuration information for any transmission reception points (TRPs) for which at least one PRS configuration has changed compared to the reference posSIB.

22. The base station of claim 13, wherein the second block of the posSIB contains complete PRS configuration information for any frequency layer for which at least one PRS configuration has changed compared to the reference posSIB.

23. The base station of claim 13, wherein the second block of the posSIB contains location information for any transmission reception points (TRPs) for which the location information of the same TRP included in the reference posSIB is different.

24. The base station of claim 13, wherein the reference encoding in the first block of the posSIB further contains a validity time for each of the one or more blocks of the posSIB.

25. A method performed by a location server for supporting broadcast of positioning assistance data in a wireless network, the method comprising:
determining the positioning assistance data to be broadcast by a base station including the positioning assistance data that has changed and the positioning assistance data that has not changed;
producing a plurality of blocks of positioning System Information Blocks (posSIB) comprising:
a first block of a posSIB, wherein the first block contains reference encoding for one or more blocks of a posSIB containing the positioning assistance data, the reference encoding indicating a second block of a posSIB that contains positioning assistance data that has changed;
the second block of the posSIB that contains the positioning assistance data that has changed compared to the positioning assistance data included in a reference posSIB, wherein the second block of the posSIB contains PRS configuration information for any transmission reception points (TRPs) for which corresponding PRS configuration has changed compared to the reference posSIB; and
sending the plurality of blocks the posSIBs to the base station.

26. The method of claim 25, wherein the reference encoding further indicates schedule information for the second block of the posSIB.

27. A method performed by a location server for supporting broadcast of positioning assistance data in a wireless network, the method comprising:
determining the positioning assistance data to be broadcast by a base station including the positioning assistance data that has changed and the positioning assistance data that has not changed;
producing a plurality of blocks of positioning System Information Blocks (posSIB) comprising:
a first block of a posSIB that contains reference encoding for one or more blocks of a posSIB containing the positioning assistance data, the reference encoding indicating a second block of a posSIB that contains positioning assistance data that has changed;
the second block of the posSIB that contains the positioning assistance data that has changed compared to the positioning assistance data included in a reference posSIB;
a third block of a posSIB that contains at least the positioning assistance data that has not changed compared to the positioning assistance data included in the reference posSIB; and
sending the plurality of blocks the posSIBs to the base station.

28. The method of claim 27, wherein the base station broadcasts the third block of the posSIB separately from the first block of the posSIB and the second block of the posSIB.

29. The method of claim 27, wherein the third block of the posSIB further contains the positioning assistance data that has changed compared to the positioning assistance data included in the reference posSIB.

30. The method of claim 25, wherein the base station broadcasts the second block of the posSIB separately from the first block of the posSIB.

31. The method of claim 25, wherein the positioning assistance data is for one of downlink positioning reference signal (PRS) assistance data or transmission reception point (TRP) location data or Real Time Difference (RTD) data.

32. The method of claim 25, wherein the second block of the posSIB contains complete PRS configuration information for any transmission reception points (TRPs) for which at least one PRS configuration has changed compared to the reference posSIB.

33. The method of claim 25, wherein the second block of the posSIB contains complete PRS configuration information for any frequency layer for which at least one PRS configuration has changed compared to the reference posSIB.

34. The method of claim 25, wherein the second block of the posSIB contains location information for any transmission reception points (TRPs) for which the location information of the same TRP included in the reference posSIB is different.

35. The method of claim 25, wherein the reference encoding in the first block of the posSIB further contains a validity time for each of the one or more blocks of the posSIB.

36. A method performed by a user equipment (UE) for supporting broadcast of positioning assistance data in a wireless network, the method comprising:
receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and
receiving and decoding the second block of the posSIB broadcast by the base station, the second block of the posSIB contains the positioning assistance data that has changed, wherein the second block of the posSIB contains PRS configuration information for any transmission reception points (TRPs) for which corresponding PRS configuration has changed compared to the reference posSIB.

37. The method of claim 36, wherein the reference encoding further indicates schedule information for the second block of the posSIB.

38. The method of claim 36, further comprising receiving a third block of the posSIB that contains at least the positioning assistance data that has not changed compared to the positioning assistance data included in the reference posSIB.

39. The method of claim 38, wherein the third block of the posSIB that contains at least the positioning assistance data that has not changed is not decoded.

40. The method of claim 38, wherein the third block of the posSIB is broadcast separately from the first block of the posSIB and the second block of the posSIB.

41. The method of claim 38, wherein the third block of the posSIB further contains the positioning assistance data that has changed compared to the positioning assistance data included in the reference posSIB.

42. The method of claim 36, wherein the second block of the posSIB is broadcast separately from the first block of the posSIB.

43. The method of claim 42, wherein the first block of the posSIB and the second block of the posSIB are broadcast separately with an offset of less than 8 radio frames.

44. The method of claim 36, wherein the positioning assistance data is for one of downlink positioning reference signal (PRS) assistance data or transmission reception point (TRP) location data or Real Time Difference (RTD) data.

45. A method performed by a user equipment (UE) for supporting broadcast of positioning assistance data in a wireless network, the method comprising:
receiving and decoding a first block of a positioning System Information Block (posSIB) broadcast by a base station, the first block of the posSIB comprising reference encoding for one or more blocks of a posSIB containing positioning assistance data, the reference encoding indicating a second block of a posSIB that contains positioning assistance data that has changed compared to the positioning assistance data included in a reference posSIB; and
receiving and decoding the second block of the posSIB broadcast by the base station, the second block of the posSIB contains the positioning assistance data that has changed, wherein the second block of the posSIB contains complete PRS configuration information for any transmission reception points (TRPs) for which at least one PRS configuration has changed compared to the reference posSIB.

46. The method of claim 36, wherein the second block of the posSIB contains complete PRS configuration information for any frequency layer for which at least one PRS configuration has changed compared to the reference posSIB.

47. The method of claim 36, wherein the second block of the posSIB contains location information for any transmission reception points (TRPs) for which the location information of the same TRP included in the reference posSIB is different.

48. The method of claim 36, wherein the reference encoding in the first block of the posSIB further contains a validity time for each of the one or more blocks of the posSIB.

* * * * *